United States Patent
Gan et al.

(10) Patent No.: US 12,034,540 B2
(45) Date of Patent: Jul. 9, 2024

(54) COMMUNICATION METHOD AND APPARATUS APPLIED TO MULTI-LINK DEVICE IN WIRELESS LOCAL AREA NETWORK

(71) Applicant: HUAWEI TECHNOLOGIES CO., LTD., Shenzhen (CN)

(72) Inventors: Ming Gan, Shenzhen (CN); Yifan Zhou, Shenzhen (CN); Dandan Liang, Shenzhen (CN); Jian Yu, Shenzhen (CN); Yunbo Li, Shenzhen (CN); Yuchen Guo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/949,494

(22) Filed: Sep. 21, 2022

(65) Prior Publication Data

US 2023/0009565 A1 Jan. 12, 2023

Related U.S. Application Data

(63) Continuation of application No. PCT/CN2021/083020, filed on Mar. 25, 2021.

(30) Foreign Application Priority Data

Mar. 27, 2020 (CN) .................. 202010240296.X

(51) Int. Cl.
*H04W 84/12* (2009.01)
*H04L 1/00* (2006.01)
*H04L 1/1607* (2023.01)

(52) U.S. Cl.
CPC .......... *H04L 1/1642* (2013.01); *H04L 1/0083* (2013.01)

(58) Field of Classification Search
CPC .... H04L 1/1642; H04L 1/0083; H04W 84/12; H04W 76/15; H04W 76/11
See application file for complete search history.

(56) References Cited

U.S. PATENT DOCUMENTS

| 2003/0157927 A1* | 8/2003 | Yi ........................ H04W 8/06 455/411 |
| 2017/0027301 A1 | 2/2017 | Mazed |

(Continued)

FOREIGN PATENT DOCUMENTS

| CN | 107205259 A | 9/2017 |
| CN | 111132146 A | 5/2020 |

(Continued)

OTHER PUBLICATIONS

IEEE P802.11ax/D6.0, Nov. 2019, Draft Standard for Information technology—Tele-communications and information exchange between systems Local and metropolitan area networks—Specific requirements, Part 11: Wireless LAN Medium Access Control (MAC) and Physical Layer (PHY) Specifications, 780 pages.

(Continued)

*Primary Examiner* — Jamal Javaid
(74) *Attorney, Agent, or Firm* — HAUPTMAN HAM, LLP

(57) ABSTRACT

This application provides a communication method, an access network device, a terminal device, and a core network device. In a process in which the terminal device is handed over from a first access network device to a second access network device, the second access network device learns of first service progress of the first access network device based on a first sequence number of a data packet forwarded by the first access network device, without introducing additional progress exchange information between the two access network devices.

20 Claims, 10 Drawing Sheets

(56) References Cited

U.S. PATENT DOCUMENTS

| | | | |
|---|---|---|---|
| 2017/0273012 A1 | 9/2017 | Zhang et al. | |
| 2017/0289021 A1* | 10/2017 | Säily | H04W 74/006 |
| 2019/0200171 A1 | 6/2019 | Huang et al. | |
| 2020/0221545 A1* | 7/2020 | Stacey | H04W 48/16 |

FOREIGN PATENT DOCUMENTS

| | | |
|---|---|---|
| EP | 3220688 B1 | 2/2020 |
| JP | 2006166245 A | 6/2006 |
| JP | 2010529730 A | 8/2010 |
| SG | 10201807626 Y | 4/2020 |
| WO | 2019177231 A1 | 9/2019 |
| WO | 2020043433 A1 | 3/2020 |

OTHER PUBLICATIONS

IEEE Std 802.11-2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.

International Search Report issued in corresponding International Application No. PCT/CN2021/083020, dated May 11, 2021, pp. 1-9.

India Office Action issued in corresponding India Application No. 202227056487, dated Dec. 16, 2022, pp. 1-7.

Cariou Laurent et al: Multi-Link Discovery—part 1; Mar. 15, 2020(Mar. 15, 2020), XP055824264, Retrieved from the Internet:URL: https://mentor. ieee.org/802.11 /dcn/20/11-20-0389-00-00be-m a lti-l ink-d iscovery-part-i.pptx; [retrieved on Jul. 14, 2021].

Chu et al:Beacon, Capability, Operating Parameters; IEEE 802 .11-19/0395r2 IEEE vol. IEEE 802 .11-19/0395r2,Mar. 1, 2020 (Mar. 1, 2020); pp. 3-6,XP009532674.

Extended European Search Report issued in corresponding European Application No. 21777113.8, dated Jul. 7, 2023, pp. 1-13.

Laurent Cariou (Intel), Multi-link discovery—part 2, IEEE 802.11-20/0390r0, IEEE, Internet URL: https://mentor.ieee.org/802.11/dcn/20/11-20-0390-00-00be-multi-link-discovery-part-2.pptx>, Mar. 15, 2020.

Laurent Cariou (Intel), Multi-link discovery—part 1, IEEE 802.11-20/0389r0, IEEE, Internet URL: https://mentor.ieee.org/802.11/dcn/20/11-20-0389-00-00be-multi-link-discovery-part-1.pptx>, Mar. 15, 2020.

* cited by examiner

COMMUNICATION METHOD AND APPARATUS APPLIED TO MULTI-LINK DEVICE IN WIRELESS LOCAL AREA NETWORK

CROSS-REFERENCE TO RELATED APPLICATION

This application is a continuation of International Application No. PCT/CN2021/083020, filed on Mar. 25, 2021, which claims priority to Chinese Patent Application No. 202010240296.X, filed on Mar. 27, 2020. The disclosure of the aforementioned applications are hereby incorporated by reference in their entireties.

TECHNICAL FIELD

This application relates to the field of communication technologies, and in particular, to a communication method and apparatus applied to a multi-link device in a wireless local area network.

BACKGROUND

To greatly improve a service transmission rate of a WLAN system, the Institute of Electrical and Electronics Engineers (IEEE) 802.11ax standard further uses an orthogonal frequency division multiple access (OFDMA) technology based on an existing orthogonal frequency division multiplexing (OFDM) technology. The OFDMA technology enables a plurality of nodes to simultaneously transmit and receive data, to achieve multi-site diversity gains. In 2017 when the 802.11ax was finalized, the Federal Communications Commission (FCC) opened a new free frequency band of 5925 to 7125 MHz, which is referred to as 6 GHz for short below. Therefore, 802.11ax standard workers extend a working range of an 802.11ax-compliant device from 2.4 GHz and 5 GHz to 2.4 GHz, 5 GHz, and 6 GHz in an 802.11ax project authorization request (PAR).

Because an IEEE 802.11 next-generation Wi-Fi protocol (EHT) device needs to be forward compatible, the device also supports an operating spectrum of the 802.11ax-compliant device, that is, 2.4 GHz, 5 GHz, and 6 GHz frequency bands. Channel division is performed based on the newly open free 6 GHz frequency band, and a supported bandwidth may exceed a maximum bandwidth of 160 MHz supported at 5 GHz, for example, may be 320 MHz. A peak throughput for the IEEE 802.11ax next-generation Wi-Fi extremely high throughput can be increased by using an ultra-large bandwidth, and can also be increased by increasing a quantity of streams, for example, increasing the quantity of streams to 16, through cooperation of a plurality of frequency bands (2.4 GHz, 5 GHz, and 6 GHz) and the like. On a same frequency band, a peak throughput may be further increased through cooperation of a plurality of channels or in another manner. This reduces a service transmission delay. In the following, a plurality of frequency bands or a plurality of channels are referred to as a plurality of links. Although a plurality of links are configured in the 802.11ax and the earlier Wi-Fi standards that have a same operating frequency band with the 802.11ax, a different basic service set (BSS) is usually established for each of the plurality of links. Communication with a station in a BSS to which the link belongs can be performed on only one link at the same time.

Main functions of 802.11ax and an earlier multiple basic service set identifier (BSSID) technology are to virtualize one physical AP into a plurality of logical APs, that is, to form a plurality of virtual networks. Each virtual network is used to manage a different station. Similar to AP products in a current Wi-Fi scenario, an AP can be virtualized into a reporting AP (home AP) and a guest AP.

How to apply the multiple BSSID technology to a multi-link device to provide the function of the plurality of virtual networks is a technical problem that is being studied by persons skilled in the art.

SUMMARY

Embodiments of this application disclose a communication method applied to a multi-link device in a WLAN and a related apparatus, to reduce a quantity of probe request frames sent by a station on a channel, and improve station association efficiency.

According to a first aspect, an embodiment of this application provides a communication method applied to a multi-link device in a WLAN. The method includes:

A station receives a probe request frame, where the station belongs to a multi-link device;

the station determines, according to a preset condition, whether to respond to the probe request frame, where the preset condition includes at least:

a reference identifier in the probe request frame does not match a reference identifier of each station in the multi-link station; and if the preset condition is satisfied, the station skips sending a probe response frame in response to the probe request frame.

In the foregoing method, the station in the multi-link station is allowed to help another station in a same multi-link device as the station to reply with the probe response frame. In this way, a quantity of probe request frames sent by stations on a channel is reduced, and air interface efficiency and station association efficiency are improved.

According to a second aspect, an embodiment of this application provides a communication method applied to a multi-link device in a WLAN. The method includes:

A station receives a probe request frame, where the station belongs to a multi-link device, and the station in the multi-link device belongs to a multiple BSSID set;

the station determines, according to a preset condition, whether to respond to the probe request frame, where the preset condition includes at least:

a reference identifier in the probe request frame does not match a reference identifier of each station in the multi-link device, and the reference identifier in the probe request frame does not match a reference identifier of each station in a multiple BSSID set to which each station in the multi-link device belongs; and if the preset condition is satisfied, the station skips sending a probe response frame in response to the probe request frame.

In the foregoing method, the station in the multi-link device is allowed to help another station in a same multi-link device as the station to reply with the probe response frame, or may help any member of a multiple BSSID set in which another station in a same multi-link device as the station is located to reply with the probe response frame. In this way, a quantity of probe request frames sent by stations on a channel is reduced, and air interface efficiency and station association efficiency are improved.

According to a third aspect, an embodiment of this application provides a communication apparatus in a WLAN. The apparatus is used in a multi-link device, and the apparatus includes:
- a transceiver unit, configured to receive a probe request frame; and
- a processing unit, configured to determine, according to a preset condition, whether to respond to the probe request frame, where the preset condition includes at least:
- a reference identifier in the probe request frame does not match a reference identifier of each station in the multi-link device; and
- the processing unit is further configured to: if the preset condition is satisfied, skip sending a probe response frame in response to the probe request frame.

In the foregoing method, the station in the multi-link device is allowed to help another station in a same multi-link device as the station to reply with the probe response frame. In this way, a quantity of probe request frames sent by stations on a channel is reduced, and air interface efficiency and station association efficiency are improved.

According to a fourth aspect, an embodiment of this application provides a communication apparatus in a WLAN. The apparatus is used in a multi-link device, and the apparatus includes:
- a transceiver unit, configured to receive a probe request frame, where a station in the multi-link device belongs to a multiple BSSID set; and
- a processing unit, configured to determine, according to a preset condition, whether to respond to the probe request frame, where the preset condition includes at least:
- a reference identifier in the probe request frame does not match a reference identifier of each station in the multi-link device, and the reference identifier in the probe request frame does not match a reference identifier of each station in a multiple BSSID set in which each station in the multi-link device is located; and
- the processing unit is further configured to: if the preset condition is satisfied, skip sending a probe response frame in response to the probe request frame.

In the foregoing method, the station in the multi-link device is allowed to help another station in a same multi-link device as the station to reply with the probe response frame, or may help any member of a multiple BSSID set in which another station in a same multi-link device as the station is located to reply with the probe response frame. In this way, a quantity of probe request frames sent by stations on a channel is reduced, and air interface efficiency and station association efficiency are improved.

In a possible implementation of the first aspect, the second aspect, the third aspect, or the fourth aspect, the probe request frame includes a receiver address;
- the reference identifier in the probe request frame is a receiver medium access control MAC address carried in the receiver address; and
- the reference identifier of the station is a MAC address of the station.

In a possible implementation of the first aspect, the second aspect, the third aspect, or the fourth aspect,
- the reference identifier in the probe request frame is a service set identifier SSID field in the probe request frame, or an SSID included in an SSID list element in the probe request frame, or an SSID corresponding to a short SSID included in a short SSID list element in the probe request frame; and the reference identifier of the station is an SSID of the station.

In a possible implementation of the first aspect, the second aspect, the third aspect, or the fourth aspect,
- the reference identifier in the probe request frame is carried in a basic service set identifier BSSID field in the probe request frame; and
- the reference identifier of the station is a BSSID of the station.

In a possible implementation of the first aspect, the second aspect, the third aspect, or the fourth aspect, one or more stations in the multi-link device belong to a multiple BSSID set.

In a possible implementation of the first aspect, the second aspect, the third aspect, or the fourth aspect, the one or more stations are transmitted BSSID stations in the multiple BSSID set.

In a possible implementation of the first aspect, the second aspect, the third aspect, or the fourth aspect, the one or more stations include nontransmitted BSSID stations in the multiple BSSID set.

According to a fifth aspect, an embodiment of this application provides a communication method applied to a multi-link device in a WLAN. The method includes:

A reporting access point AP sends multi-link device MLD information to a station, where the reporting AP belongs to one AP multi-link device, and the AP multi-link device includes the reporting AP and a reported AP.

The MLD information includes information about the reporting AP and information about the reported AP, where the information about the reporting AP indicates the reporting AP, and the information about the reported AP indicates the reported AP.

In the foregoing method, the reporting access point indicates, to the station via the MLD information, a structure of a multiple BSSID set based on the AP multi-link device, so that concurrent communication (for example, establishing an association) between a plurality of APs in the AP multi-link device and a plurality of STAs in a STA multi-link device can be supported, to increase a throughput of a wireless network, improve transmission robustness, and reduce a transmission delay.

According to a sixth aspect, an embodiment of this application provides a communication method applied to a multi-link device in a WLAN. The method includes:

A station receives multi-link device MLD information sent by a reporting access point AP, where the reporting AP belongs to one AP multi-link device, and the AP multi-link device includes the reporting AP and a reported AP; and
- the MLD information includes information about the reporting AP and information about the reported AP, where the information about the reporting AP indicates the reporting AP, and the information about the reported AP indicates the reported AP; and
- parses the multi-link device MLD information to obtain the information about the reporting AP and the information about the reported AP.

In the foregoing method, the reporting access point indicates, to the station via the MLD information, a structure of a multiple BSSID set based on the AP multi-link device, so that concurrent communication (for example, establishing an association) between a plurality of APs in the AP multi-link device and a plurality of STAs in a STA multi-link device can be supported, to increase a throughput of a wireless network, improve transmission robustness, and reduce a transmission delay.

According to a seventh aspect, an embodiment of this application provides a communication apparatus used in a multi-link device in a WLAN. The communication apparatus is used in a reporting access point AP, and the communication apparatus includes:

a processing unit, configured to generate multi-link device MLD information; and a transceiver unit, configured to send the multi-link device MLD information to a station, where the reporting AP belongs to one AP multi-link device, and the AP multi-link device includes the reporting AP and a reported AP.

The MLD information includes information about the reporting AP and information about the reported AP, where the information about the reporting AP indicates the reporting AP, and the information about the reported AP indicates the reported AP.

In the foregoing apparatus, the reporting access point indicates, to the station via the MLD information, a structure of a multiple BSSID set based on the AP multi-link device, so that concurrent communication (for example, establishing an association) between a plurality of APs in the AP multi-link device and a plurality of STAs in a STA multi-link device can be supported, to increase a throughput of a wireless network, improve transmission robustness, and reduce a transmission delay.

According to an eighth aspect, an embodiment of this application provides a communication apparatus used in a multi-link device in a WLAN. The apparatus is used in a station, and the apparatus includes:

a transceiver unit, configured to receive multi-link device MLD information sent by a reporting access point AP, where the reporting AP belongs to one AP multi-link device, and the AP multi-link device includes the reporting AP and a reported AP; and the MLD information includes information about the reporting AP and information about the reported AP, where the information about the reporting AP indicates the reporting AP, and the information about the reported AP indicates the reported AP; and a processing unit, configured to parse the multi-link device MLD information to obtain the information about the reporting AP and the information about the reported AP.

In the foregoing apparatus, the reporting access point indicates, to the station via the MLD information, a structure of a multiple BSSID set based on the AP multi-link device, so that concurrent communication (for example, establishing an association) between a plurality of APs in the AP multi-link device and a plurality of STAs in a STA multi-link device can be supported, to increase a throughput of a wireless network, improve transmission robustness, and reduce a transmission delay.

In a possible implementation of the fifth aspect, the sixth aspect, the seventh aspect, or the eighth aspect, an AP in the AP multi-link device belongs to a multiple BSSID set, the information about the reporting AP further indicates a multiple BSSID set to which the reporting AP belongs, and the information about the reported AP further indicates a multiple BSSID set to which the reported AP belongs.

In a possible implementation of the fifth aspect, the sixth aspect, the seventh aspect, or the eighth aspect, the information about the reporting AP includes a multiple BSSID element of a multiple BSSID set to which the reporting AP belongs.

In a possible implementation of the fifth aspect, the sixth aspect, the seventh aspect, or the eighth aspect, the information about the reported AP includes a multiple BSSID element of a multiple BSSID set to which the reported AP belongs.

In a possible implementation of the fifth aspect, the sixth aspect, the seventh aspect, or the eighth aspect, the information about the reporting AP further includes a BSSID of a BSS to which the reporting AP belongs.

In a possible implementation of the fifth aspect, the sixth aspect, the seventh aspect, or the eighth aspect, the information about the reported AP further includes a transmitted BSSID in a multiple BSSID set to which the reported AP belongs.

In a possible implementation of the fifth aspect, the sixth aspect, the seventh aspect, or the eighth aspect, after the reporting access point AP sends the multi-link device MLD information to the station, the method further includes:

receiving a probe request frame, an authentication request frame, or an association request frame sent by the station via the MLD information.

In a possible implementation of the fifth aspect, the sixth aspect, the seventh aspect, or the eighth aspect, one or more APs in the AP multi-link devices belong to a multiple BSSID set.

In a possible implementation of the fifth aspect, the sixth aspect, the seventh aspect, or the eighth aspect, the one or more stations are transmitted BSSID APs in the multiple BSSID set.

In a possible implementation of the fifth aspect, the sixth aspect, the seventh aspect, or the eighth aspect, the reporting AP is a transmitted BSSID AP in a multiple BSSID set to which the reporting AP belongs; and the reported AP is a transmitted BSSID AP in a multiple BSSID set to which the reported AP belongs.

In a possible implementation of the fifth aspect, the sixth aspect, the seventh aspect, or the eighth aspect, the information about the reported AP further includes multiple BSSID related information of the reported AP, and the multiple BSSID related information of the reported AP indicates whether the reported AP belongs to a multiple BSSID set; or indicates whether the reported AP is a nontransmitted BSSID AP; or indicates whether the reported AP belongs to a multiple BSSID set and whether the reported AP is a transmitted BSSID AP.

In a possible implementation of the fifth aspect, the sixth aspect, the seventh aspect, or the eighth aspect, the multiple BSSID related information of the reported AP is included in a multiple BSSID element of a multiple BSSID set to which the reported AP belongs.

In a possible implementation of the fifth aspect, the sixth aspect, the seventh aspect, or the eighth aspect, the one or more APs include nontransmitted BSSID APs in the multiple BSSID set.

In a possible implementation of the fifth aspect, the sixth aspect, the seventh aspect, or the eighth aspect, the MLD information further includes information about a virtual AP, where the information about the virtual AP indicates the virtual AP. The virtual AP and the reporting AP are not in a same AP multi-link device, and the virtual AP belongs to a same AP multi-link device as a nontransmitted AP in the multiple BSSID set to which the reporting AP belongs. In addition, no member AP belonging to the AP multi-link device in which the reporting AP is located exists on an operating link of the virtual AP, or a member AP belonging to the AP multi-link device in which the reporting AP is located exists on an operating link of the virtual AP but is not in a same multiple BSSID set as the virtual AP.

In a possible implementation of the fifth aspect, the sixth aspect, the seventh aspect, or the eighth aspect, the information about the virtual AP indicates a multiple BSSID set to which the virtual AP belongs.

In a possible implementation of the fifth aspect, the sixth aspect, the seventh aspect, or the eighth aspect, the information about the virtual AP includes a multiple BSSID element of a multiple BSSID set to which the virtual AP belongs.

In a possible implementation of the fifth aspect, the sixth aspect, the seventh aspect, or the eighth aspect, the information about the virtual AP includes information about a transmitted BSSID AP in a multiple BSSID set to which the virtual AP belongs.

In a possible implementation of the fifth aspect, the sixth aspect, the seventh aspect, or the eighth aspect, a BSSID of a BSS to which the virtual AP belongs is used as a transmitted BSSID in a multiple BSSID set to which the virtual AP belongs.

In a possible implementation of the fifth aspect, the sixth aspect, the seventh aspect, or the eighth aspect, the information about the virtual AP includes multiple BSSID related information of the virtual AP, and the multiple BSSID related information of the virtual AP indicates whether the virtual AP belongs to a multiple BSSID set; or indicates whether the virtual AP is a nontransmitted BSSID AP; or indicates whether the virtual AP belongs to a multiple BSSID set and whether the virtual AP is a transmitted BSSID AP.

In a possible implementation of the fifth aspect, the sixth aspect, the seventh aspect, or the eighth aspect, the multiple BSSID related information of the virtual AP is included in a multiple BSSID element of a multiple BSSID set to which the virtual AP belongs.

In a possible implementation of the fifth aspect, the sixth aspect, the seventh aspect, or the eighth aspect, the MLD information further includes shared information. The shared information includes one or more of a MAC address of the AP multi-link device and a quantity of information fields that is of the reported AP and that carry information about the reported AP.

In a possible implementation of the fifth aspect, the sixth aspect, the seventh aspect, or the eighth aspect, the shared information further includes a distinguishing field. The distinguishing field indicates a field in which the information about the reported AP is located and a field in which the information about the virtual AP is located.

The communication apparatus in the third aspect, the fourth aspect, the seventh aspect, and the eighth aspect may be a chip, the processing unit may be a processing circuit of the chip, and the transceiver unit may be an input/output interface circuit. The processing circuit may be configured to process signaling or data information provided by the input/output interface circuit, and the input/output interface circuit may be configured to input/output the data or signaling information for the chip.

According to a ninth aspect of embodiments of this application, a computer-readable storage medium is provided. The computer-readable storage medium stores computer program code. When the computer program is run on a processor, the processor is enabled to perform the method in any one of the first aspect, the second aspect, the fifth aspect, the sixth aspect, and the corresponding possible implementations.

According to a tenth aspect of embodiments of this application, a computer program product is provided. The program product stores a computer program (instructions) executed by the foregoing processor. When the computer program runs on the processor, the processor is enabled to perform the method in any one of the first aspect, the second aspect, the fifth aspect, the sixth aspect, and the corresponding possible implementations.

According to an eleventh aspect of embodiments of this application, a communication apparatus is provided. The apparatus includes a processor, and may further include a transceiver and a memory. The transceiver is configured to receive and send information, or is configured to communicate with another network element. The memory is configured to store a computer program (instructions). The processor is configured to execute the computer program, to support the communication apparatus to implement the method in any one of the first aspect, the second aspect, the fifth aspect, the sixth aspect, and the corresponding possible implementations.

According to a twelfth aspect of embodiments of this application, a communication apparatus is provided. The apparatus may exist in a product form of a chip. A structure of the apparatus includes a processor, and may further include a memory. The memory is configured to couple to the processor and store a program (instructions) and data that are necessary for the apparatus. The processor is configured to execute the computer program stored in the memory, to support the communication apparatus to perform the method in any one of the first aspect, the second aspect, the fifth aspect, the sixth aspect, and the corresponding possible implementations. Optionally, the memory may be located in the processor, and is an internal storage. Alternatively, the processor may be located outside the processor, is coupled to the processor, and is an external storage.

According to a thirteenth aspect of embodiments of this application, a communication apparatus is provided. The apparatus may exist in a product form of a chip. A structure of the apparatus includes a processor and an interface circuit. The processor is configured to communicate with another apparatus through the interface circuit, so that the apparatus performs the method in any one of the first aspect, the second aspect, the fifth aspect, the sixth aspect, and the corresponding possible implementations.

BRIEF DESCRIPTION OF DRAWINGS

The following describes the accompanying drawings used in embodiments of this application.

DESCRIPTION OF EMBODIMENTS

Figure 1:
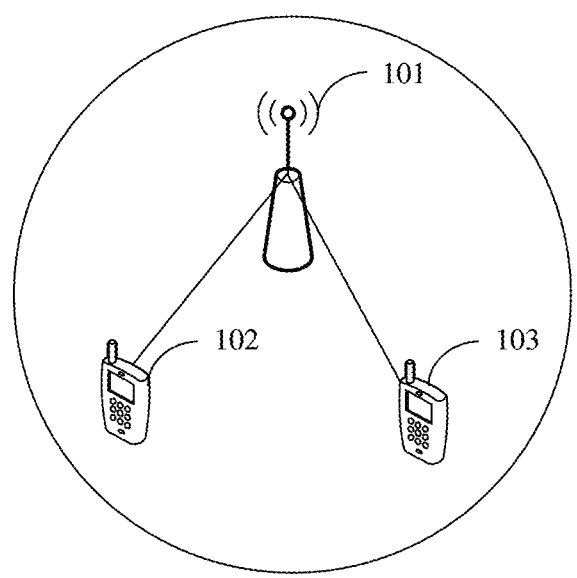
FIG. 1 is a schematic diagram of a structure of a communication system according to an embodiment of this application.

The following first describes related technologies in this application, and then describes embodiments of this application with reference to the accompanying drawings.

Embodiments of this application provide a communication method applied to a wireless communication system. The wireless communication system may be a wireless local area network (WLAN) or a cellular network. The method may be implemented by a communication device in the wireless communication system or a chip or a processor in the communication device. The communication device may be a wireless communication device that supports concurrent transmission on a plurality of links. For example, the communication device is referred to as a multi-link device or a multi-band device. For example, in the wireless local area network, the communication device supports communication by using an IEEE 802.11 series protocol, and the IEEE 802.11 series protocol includes 802.11be, 802.11ax, or 802.11a/b/g/n/ac.

1. Multi-Link Device (MLD), Also Referred to as a Multi-Band Device

The multi-link device MLD includes one or more affiliated stations, and the affiliated station is a logical station. "A multi-link device includes an affiliated station" is also briefly described as "A multi-link device includes a station" in embodiments of this application. An affiliated station may be an access point (AP) or a non-access point station (non-AP STA). For ease of description, in this application, a multi-link device whose affiliated station is an AP may be referred to as a multi-link AP, a multi-link AP device, or an AP multi-link device, and a multi-link device whose affiliated station is a non-AP STA may be referred to as a multi-link STA, a multi-link STA device, or a STA multi-link device.

The multi-link device MLD may implement wireless communication in compliance with 802.11 series protocols, for example, in compliance with the Extremely High Throughput (EHT) protocol, or in compliance with 802.11be-based or 802.11be-compatible protocol, thereby implementing communication with another device. The another device may be a multi-link device or may not be a multi-link device.

Each logical station may operate on one link, while a plurality of logical stations are allowed to operate on a same link. A link identifier mentioned below identifies or represents one station operating on one link. In other words, if there is more than one logical station on one link, more than one link identifier is required to identify or represent the logical stations. The link mentioned below sometimes also indicates a station operating on the link. If data transmission is performed between a multi-link device and another multi-link device, before communication, the multi-link device and the another multi-link device may first negotiate or communicate with each other about a correspondence between a link identifier and a link or a station on a link, or an AP multi-link device indicates a correspondence between a link identifier and a link or a station on a link through a broadcast management frame, for example, a beacon frame. Therefore, during data transmission, a link identifier is carried to indicate a link or a station on a link, so that transmission of a large amount of signaling information is not needed to indicate the link or the station on the link. This reduces signaling overheads and improves transmission efficiency.

The following uses an example in which the foregoing one multi-link device is an AP multi-link device, and the foregoing another multi-link device is a STA multi-link device for description. In an example, when the AP multi-link device establishes a BSS, a management frame, for example, a beacon frame, sent by the AP multi-link device carries an element including a plurality of link identifier information fields. Each link identifier information field may indicate a correspondence between a link identifier and a station operating on a link. Each link identifier information field includes a link identifier, and further includes one or more of a MAC address, an operating class, and a channel number. One or more of the MAC address, the operating class, and the channel number may identify a link. In another example, in a multi-link association establishment process, the AP multi-link device and the STA multi-link device negotiate for a plurality of link identifier information fields. In subsequent communication, the AP multi-link device or the STA multi-link device identifies or represents a station in the multi-link device by using a link identifier. The link identifier may further represent one or more attributes of a MAC address, an operating set, and a channel number of the station. The MAC address may alternatively be an association identifier of the associated AP multi-link device. Optionally, if a plurality of stations operate on one link, meanings represented by a link identifier (which is a numeric ID) include not only a channel number and an operating class in which the link is located, but also an identifier of a station operating on the link, for example, a MAC address or an AID of a station.

FIG. 1 is a diagram of an application scenario according to an embodiment of this application by using a wireless local area network as an example. The application scenario includes: a first station 101 and a second station 102. The first station 101 may communicate with the second station 102 through a plurality of links, to achieve effect of improving a throughput. The first station may be a multi-link device, and the second station may be a single-link device, a multi-link device, or the like. In a scenario, the first station 101 is an AP multi-link device, and the second station 102 is a STA multi-link device or a station (for example, a single-link station). In another scenario, the first station 101 is a STA multi-link device, and the second station 102 is an AP (for example, a single-link AP) or an AP multi-link device. In still another scenario, the first station 101 is an AP multi-link device, and the second station 102 is an AP multi-link device or an AP. In yet another scenario, the first station 101 is a STA multi-link device, and the second station 102 is a STA multi-link device or a STA. Certainly, the wireless local area network may further include another device. A quantity and types of devices shown in FIG. 1 are merely examples.

Figure 2A:
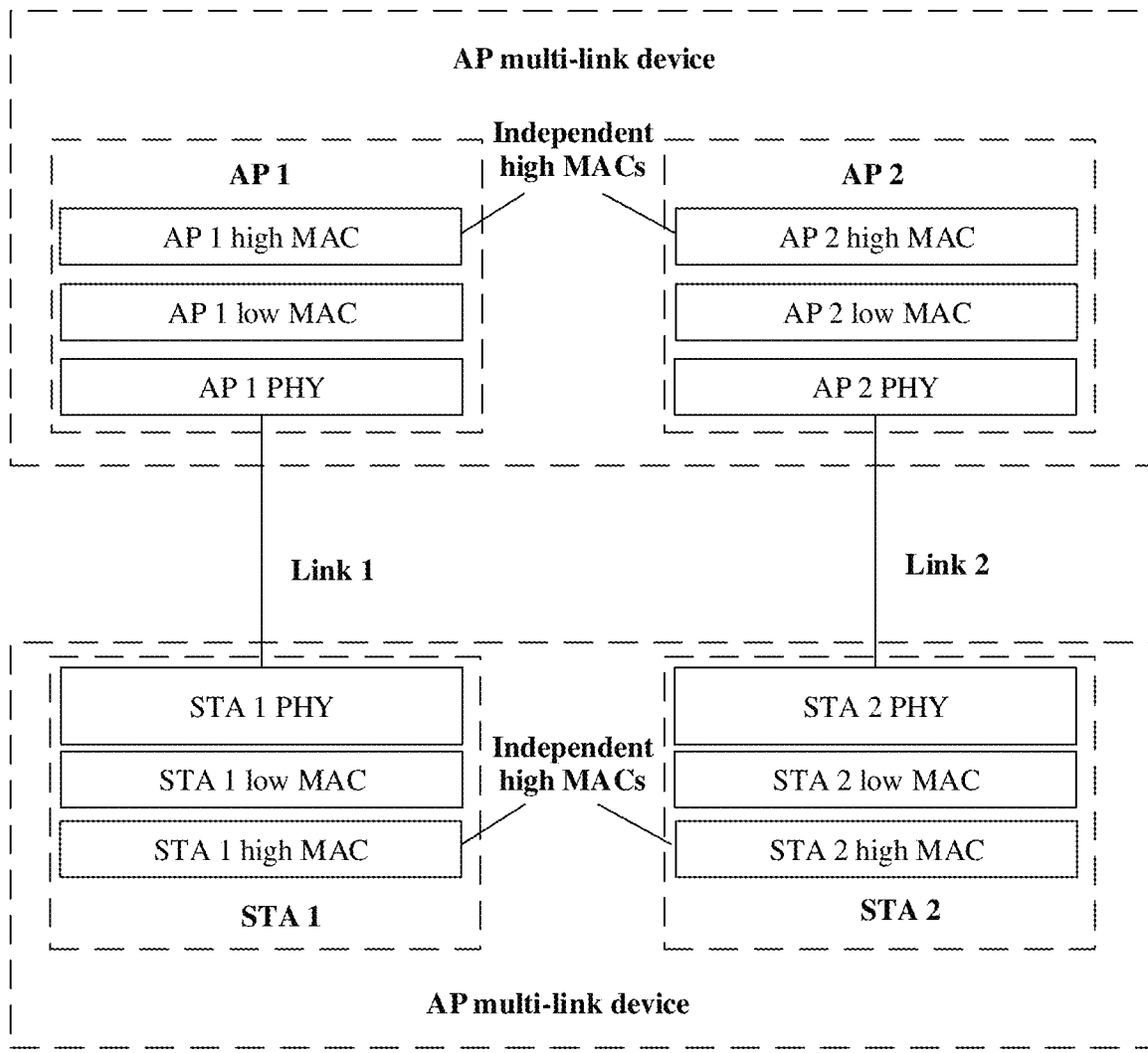
FIG. 2(a) is a schematic diagram of a structure of a multi-link device according to an embodiment of this application.
Figure 2B:
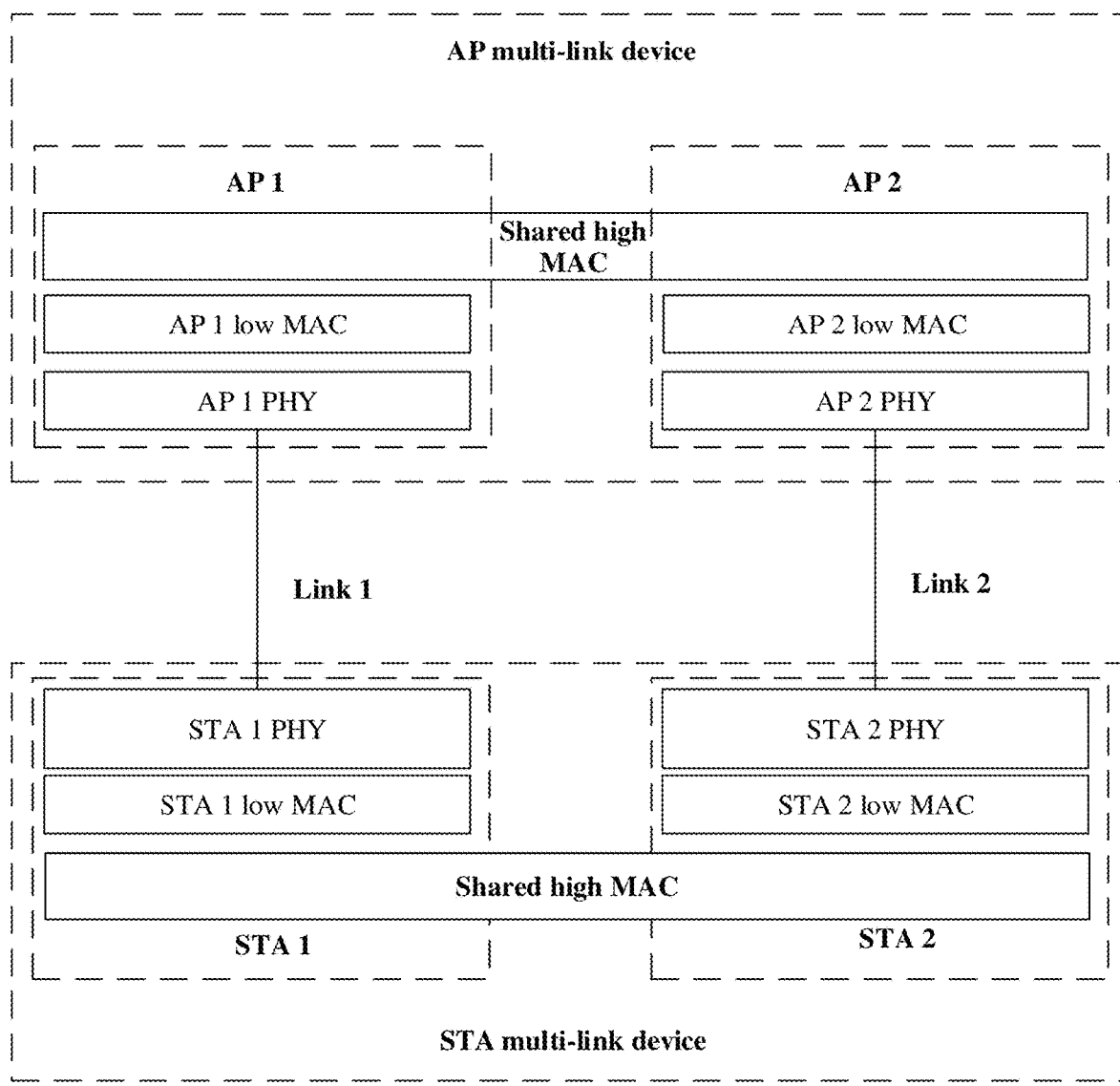
FIG. 2(b) is a schematic diagram of another structure of a multi-link device according to an embodiment of this application.

FIG. 2(a) and FIG. 2(b) show schematic diagrams of structures of an AP multi-link device and a STA multi-link device that participate in communication. The 802.11 standards focus on 802.11 physical layer (PHY) and media access control (MAC) layer parts of an AP multi-link device and a STA multi-link device (such as a mobile phone and a notebook computer).

As shown in FIG. 2(a), a plurality of APs included in the AP multi-link device are independent of each other at a low MAC layer and a PHY layer, and are also independent of each other at a high MAC layer. A plurality of STAs included in the STA multi-link device are independent of each other at a low MAC layer and a PHY layer, and are also independent of each other at a high MAC layer.

As shown in FIG. 2(b), a plurality of APs included in the AP multi-link device are independent of each other at a low MAC layer and a PHY layer, and share a high MAC layer. A plurality of STAs included in the STA multi-link device are independent of each other at a low MAC layer and a PHY layer, and share a high MAC layer.

Certainly, the STA multi-link device may use a structure in which high MAC layers are independent of each other, and the AP multi-link device may use a structure in which a high MAC layer is shared. Alternatively, the STA multi-link device may use a structure in which a high MAC layer is shared, and the AP multi-link device may use a structure in which high MAC layers are independent of each other. For example, the high MAC layer or the low MAC layer may be implemented by one processor in a chip system of the multi-link device, or may be implemented by different processing modules in a chip system.

Figure 2C:
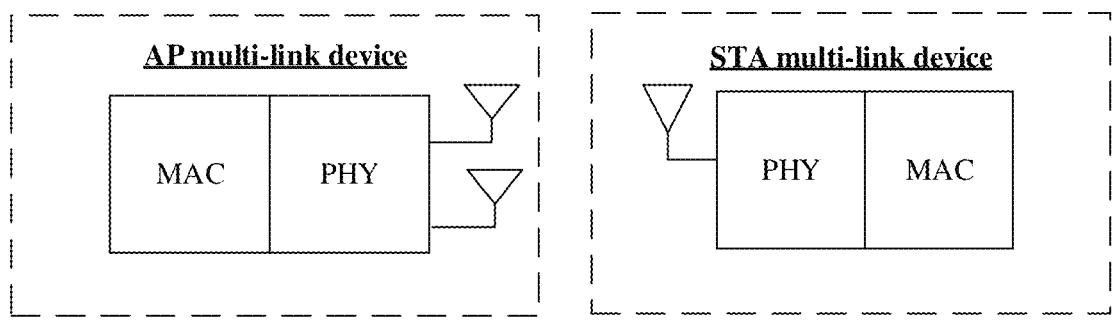
FIG. 2(c) is a schematic diagram of another structure of a multi-link device according to an embodiment of this application.

For example, the multi-link device in embodiments of this application may be a single-antenna device, or may be a multi-antenna device. For example, the multi-link device may be a device with more than two antennas. A quantity of antennas included in the multi-link device is not limited in embodiments of this application. For example, FIG. 2(c) shows an example in which an AP multi-link device is a multi-antenna device and a STA multi-link device is a single-antenna device. In embodiments of this application, the multi-link device may allow services of a same access type to be transmitted on different links, or even allow same data packets to be transmitted on different links. Alternatively, the multi-link device may not allow services of a same access type to be transmitted on different links, but may allow services of different access types to be transmitted on different links.

Figure 3A:
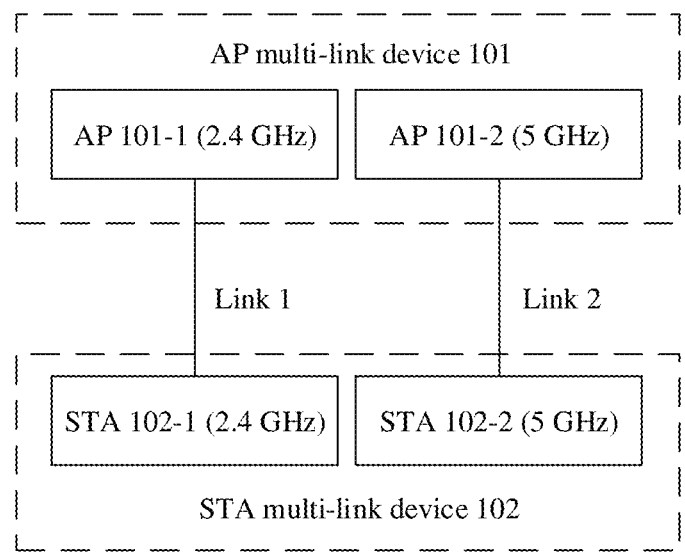
FIG. 3(a) is a schematic diagram of multi-link communication according to an embodiment of this application.
Figure 3B:
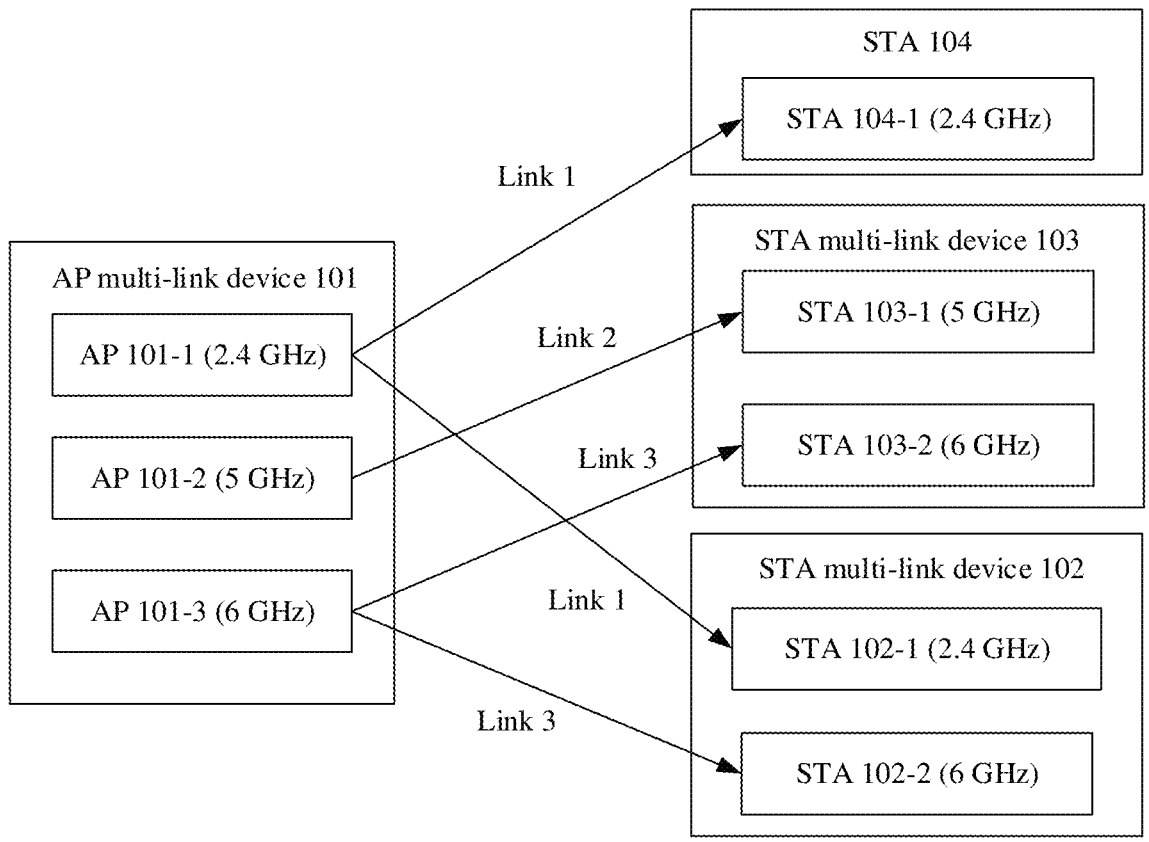
FIG. 3(b) is another schematic diagram of multi-link communication according to an embodiment of this application.

An operating frequency band of the multi-link device may include but is not limited to: sub 1 GHz, 2.4 GHz, 5 GHz, 6 GHz, and a high frequency 60 GHz. FIG. 3(a) and FIG. 3(b) show two schematic diagrams of communication between a multi-link device and another device by using a plurality of links in a wireless local area network.

FIG. 3(a) shows a scenario in which an AP multi-link device 101 communicates with a STA multi-link device 102. The AP multi-link device 101 includes an affiliated AP 101-1 and an affiliated AP 101-2, the STA multi-link device 102 includes an affiliated STA 102-1 and an affiliated STA 102-2, and the AP multi-link device 101 communicate with the STA multi-link device 102 in parallel on a link 1 and a link 2.

FIG. 3(b) shows a scenario in which an AP multi-link device 101 communicates with a STA multi-link device 102, a STA multi-link device 103, and a STA 104. The AP multi-link device 101 includes an affiliated AP 101-1 to an affiliated AP 101-3. The STA multi-link device 102 includes two affiliated STAs: a STA 102-1 and a STA 102-2. The STA multi-link device 103 includes two affiliated STAs: a STA 103-1 and a STA 103-2. The STA 104 is a single-link device. The AP multi-link device may separately communicate with the STA multi-link device 102 on a link 1 and a link 3, communicate with the STA multi-link device 103 on a link 2 and the link 3, and communicate with the STA 104 on the link 1. In an example, the STA 104 operates on a 2.4 GHz frequency band. The STA multi-link device 103 includes the STA 103-1 and the STA 103-2, the STA 103-1 operates on a 5 GHz frequency band, and the STA 103-2 operates on a 6 GHz frequency band. The STA multi-link device 102 includes the STA 102-1 and the STA 102-2, the STA 102-1 operates on a 2.4 GHz frequency band, and the STA 102-2 operates on a 6 GHz frequency band. The AP 101-1 that operates on the 2.4 GHz frequency band in the AP multi-link device may perform uplink or downlink data transmission with the STA 104 and the STA 102-2 in the STA multi-link device 102 on the link 1. The AP 101-2 that operates on the 5 GHz frequency band and that is in the AP multi-link device may perform uplink or downlink data transmission with the STA 103-1 operating on the 5 GHz frequency band in the STA multi-link device 103 on the link 2. The AP 101-3 that operates on the 6 GHz frequency band and that is in the AP multi-link device 101 may perform uplink or downlink data transmission with the STA 102-2 operating on the 6 GHz frequency band in the STA multi-link device 102 on the link 3, and may also perform uplink or downlink data transmission with the STA 103-2 in the STA multi-link device on the link 3.

It should be noted that FIG. 3(a) shows that the AP multi-link device supports only two frequency bands, and FIG. 3(b) uses only an example in which the AP multi-link device supports three frequency bands (2.4 GHz, 5 GHz, and 6 GHz), each frequency band corresponds to one link, and the AP multi-link device 101 may operate on one or more of the link 1, the link 2, and the link 3. On an AP side or a STA side, the link herein may also be understood as a station operating on the link. In an actual application, the AP multi-link device and the STA multi-link device may further support more or fewer frequency bands. In other words, the AP multi-link device and the STA multi-link device may operate on more links or fewer links. This is not limited in this embodiment of this application.

For example, the multi-link device is an apparatus having a wireless communication function. The apparatus may be a device of an entire system, or may be a chip, a processing system, or the like installed in the device of the entire system. The device on which the chip or the processing system is installed may be controlled by the chip or the processing system, to implement the method and functions in embodiments of this application. For example, the multi-link STA in this embodiment of this application has a wireless receiving and sending function, may support the 802.11 series protocols, and may communicate with a multi-link AP, another multi-link STA, or a single-link device. For example, the multi-link STA is any user communication device that allows a user to communicate with an AP and further communicate with a WLAN. For example, the multi-link STA may be user equipment that can be connected to the Internet, such as a tablet computer, a desktop computer, a laptop computer, a notebook computer, an ultra-mobile personal computer (UMPC), a handheld computer, a netbook, a personal digital assistant (PDA), or a mobile phone, or an Internet of Things node in the Internet of Things, or an in-vehicle communication apparatus in the Internet of Vehicles, or the like. The multi-link STA may alternatively be a chip and a processing system in the foregoing terminals. The multi-link AP in embodiments of this application is an apparatus for providing a service for a multi-link STA, and may support the 802.11 series protocols. For example, the multi-link AP may be a communication entity such as a communication server, a router, a switch, or a bridge, or the multi-link AP may include various forms of macro base stations, micro base stations, relay stations, and the like. Certainly, the multi-link AP may further be chips and processing systems in these various forms of devices. In this way, the method and the functions in embodiments of this application are implemented. In addition, the multi-link device may support high-rate and low-latency transmission. With continuous evolution of wireless local area network application scenarios, the multi-link device may be further used in more scenarios. For example, the multi-link device serves as a sensor node (for example, a smart water meter, a smart electricity meter, or a smart air detection node) in a smart city, a smart device (for example, a smart camera, a projector, a display screen, a television, a stereo, a refrigerator, or a washing machine) in smart home, a node in the Internet of things, an entertainment terminal (for example, AR, VR, or another wearable device), a smart device (for example, a printer, or a projector) in a smart office, an Internet of vehicles device in the Internet of vehicles, or an infrastructure (for example, a vending machine, a self-service navigation console, a self-checkout device, or a self-service food machine) in daily life scenarios. Specific forms of the multi-link STA and the multi-link AP are not specially limited in embodiments of this application, and are merely examples for description herein. The 802.11 series protocols may include 802.11be, 802.11ax, 802.11a/b/g/n/ac, and the like.

2. Multiple Base Service Set Identifier BSSID) Mode

A multiple BSSID set is a combination of some cooperative APs, and all the cooperative APs use a same operating class, a same channel number, and a same antenna port. In the multiple BSSID set, there is only one transmitted BSSID AP, and other APs are nontransmitted BSSID APs. Information about the multiple BSSID set (namely, a multiple BSSID element) is carried in a beacon frame, a probe response frame, or a neighbor report sent by the transmitted BSSID AP. Information about BSSIDs of the nontransmitted BSSID AP is derived based on the multiple BSSID element or the like in the received beacon frame, probe response frame, or neighbor report.

In a multiple BSSID technology, one physical AP may be virtualized into a plurality of logical APs. Each virtual AP manages one BSS. Different virtual APs usually have different SSIDs and permission, such as security mechanisms or transmission occasions. A BSSID corresponding to one virtual AP of the plurality of APs obtained through virtualization is configured as a transmitted BSSID. The virtual AP may be referred to as a transmitted AP. A BSSID corresponding to another virtual AP is configured as a nontransmitted BSSID. The virtual AP may be referred to as a nontransmitted AP. Generally, a plurality of APs in a multiple BSSID set may also be understood as a plurality of cooperative AP devices obtained by virtualizing one AP device. Only an AP whose BSSID is a transmitted BSSID can send a beacon frame and a probe response frame. If a probe request frame sent by a STA is for an AP whose BSSID is a nontransmitted BSSID in a multiple BSSID set, the AP whose BSSID is the transmitted BSSID needs to assist in replying with the probe response frame. The beacon frame sent by the AP whose BSSID is the transmitted BSSID includes a multiple BSSID element, and the APs whose BSSID is the nontransmitted BSSID cannot send a beacon frame. Association identifiers (AID) allocated by the plurality of virtual APs to stations managed by the plurality of virtual APs share one space. In other words, AIDs allocated to the stations in a plurality of virtual BSSs cannot be the same.

Optionally, as shown in Table 1, the multiple BSSID element includes an element ID, a length, a maximum BSSID indication, and a subelement. The maximum BSSID indication indicates that a maximum quantity of BSSIDs included in the multiple BSSID set is n. Optionally, the subelement includes information about each nontransmitted BSSID. A receive end may calculate a value of each BSSID in the multiple BSSID set based on a reference BSSID, the maximum BSSID indication, and a sequence number of each BSSID. Each BSSID includes 48 bits, a value of the most significant (48−n) bits of each BSSID in the multiple BSSID set is the same as a value of the most significant 48−n bits of the reference BSSID, a value of the least significant n bits of each BSSID in the multiple BSSID set is obtained through a modulo operation on a sum of a value of the least significant n bits of the reference BSSID and a value of a sequence number x of the BSSID by using 2n. The reference BSSID (namely, a transmitted BSSID) is carried in a BSSID field in a MAC header of a frame (for example, a beacon frame) in the multiple BSSID element. For a specific calculation method, refer to the 802.11-2016 standard.

TABLE 1

| Multiple BSSID element | | | |
|---|---|---|---|
| Element ID | Length | Maximum BSSID indication | Optional subelement |
| Byte 1 | 1 | 6 | Variable |

The "optional subelement" in Table 1 may be shown in Table 2.

TABLE 2

| Optional subelement | | |
|---|---|---|
| Subelement ID | Name | Expandable or unexpandable |
| 0 | Nontransmitted BSSID profile | Unexpandable |
| 1 to 220 | Reserved | |
| 221 | Vendor-specific | Vendor-defined |
| 222 to 255 | Reserved | |

In Table 2, the nontransmitted BSSID profile includes an element or elements of one or more APs or DMG STAs having a nontransmitted BSSID, and the nontransmitted BSSID profile includes but is not limited to the following elements:

1. A plurality of other elements in a beacon and a nontransmitted BSSID capability related element that need to be included in each nontransmitted BSSID;

2. An SSID element and a multiple BSSID-index element;
3. An FMS descriptor element that is further included if the multiple BSSID element is carried in the beacon;
4. None of the following elements: a timestamp and beacon interval field (The Timestamp and Beacon Interval field), a DSSS parameter set, an IBSS parameter set, a country, a channel switch announcement, an extended channel switch notification, wide bandwidth channel switch, a transmit power envelope, a supported operating class, IBSS DFS, ERP information, HT capabilities, an HT operation, VHT Capabilities, a VHT Operation, SIG Beacon Compatibility, a short beacon interval, SIG capabilities, an SIG operation 11ah), and the like, where these elements usually have same element values as the AP corresponding to the transmitted BSSID; and
5. An optional non-inheritance element: The element is the last element in the nontransmitted BSSID profile. The non-inheritance element includes IDs and element ID extensions of a series of elements that are in the nontransmitted BSSID and that cannot be inherited from the transmitted BSSID. It should be noted that specific content of the element is omitted herein. Specifically, as shown in Table 3, the non-inheritance element includes an element ID, a length, an element ID extension, an element ID list, and an element ID extension list. The element ID extension list is present only when an element ID value is 255.

TABLE 3

| Non-inheritance element | | | | |
| --- | --- | --- | --- | --- |
| 1 byte | 1 byte | 1 byte | One or more bytes | One or more bytes |
| Element ID | Length | Element ID extension | Element ID list | Element ID extension list |

How to apply the multiple BSSID technology to a multi-link device to provide a function of a plurality of virtual networks is a technical problem that is being studied by persons skilled in the art.

Figure 4:
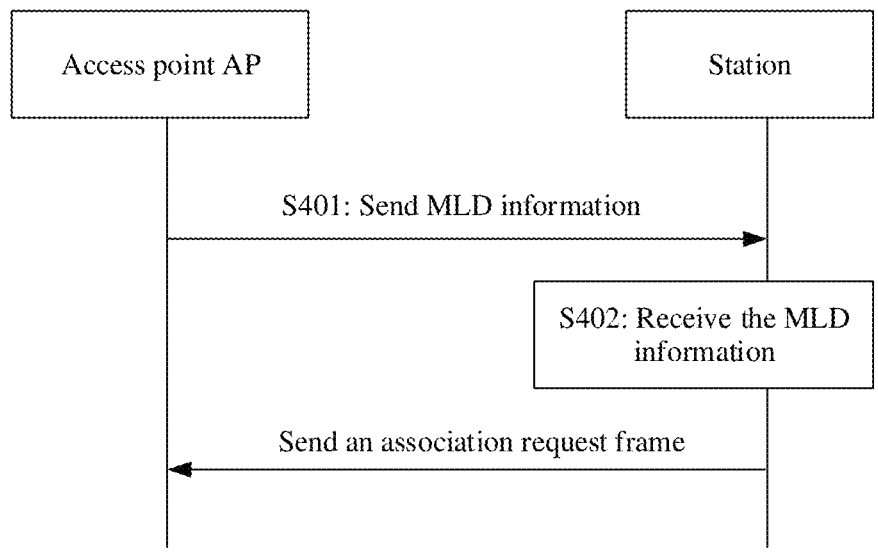
FIG. 4 is a schematic interaction diagram of a communication method applied to a multi-link device in a WLAN according to an embodiment of this application.

FIG. 4 shows an information indication method based on a multi-link device and a multiple BSSID according to an embodiment of this application. The method may be applied between stations, between an access point and a station, and between access points. For ease of description, in this embodiment of this application, communication between an access point and a station is used as an example. The method includes but is not limited to the following steps.

Step S401: An access point sends MLD information to a station.

The access point belongs to one MLD. For example, the access point is an AP in an AP multi-link device. The station that receives the MLD information may be a station in a multi-link station device, or may be a single-link station. In a BSS of another type, the MLD information may alternatively be sent by a station, and the station belongs to one MLD. The MLD information may alternatively be received by an access point. The access point belongs to one MLD, or is a single-link access point. The following descriptions are described by using an example in which the access point sends the MLD information to the station.

The AP that sends the MLD information and that is in the AP multi-link device may be referred to as a reporting AP. An information field of a reported AP includes information about another AP in the MLD to which the reporting AP belongs.

The MLD information includes information about the reporting AP and information about the reported AP, where the information about the reporting AP indicates the reporting AP, and the information about the reported AP indicates the reported AP.

Optionally, the AP in the AP multi-link device belongs to a multiple BSSID set, the information about the reporting AP further indicates a multiple BSSID set to which the reporting AP belongs, and the information about the reported AP further indicates a multiple BSSID set to which the reported AP belongs.

The MLD information carries information for associating the station with the AP multi-link device, so that the station receiving the information can be associated with the corresponding AP. Optionally, the MLD information may be carried in a management frame, for example, a beacon frame, an association response frame, a probe response frame, an authentication frame, or a neighbor report.

It should be noted that the MLD information may further include multiple BSSID information and the like. Certainly, the MLD information may have another name. This is not specifically limited in this embodiment of this application.

The AP multi-link device includes n logical APs operating on n different links. Therefore, the APs may be represented by using link identifiers link 1, link 2, . . . , and link n, and MAC addresses of the APs are different. An AP multi-link device is identified by using an MLD MAC address, in other words, the MAC address is for identifying an AP multi-link device management entity. A MAC address of the AP multi-link device may be the same as one MAC address of the n logical APs included in the multi-link AP, or may be different from all MAC addresses of the n logical APs. For example, the MAC address of the AP multi-link device is a common MAC address, and may identify the AP multi-link device.

In an example, one or more logical APs in the AP multi-link device may belong to one or more multiple base service set identifier (BSSID) sets. In an example, logical APs in an AP multi-link device belong to different multiple BSSID sets. In another example, a plurality of logical APs in the AP multi-link device may belong to a same multiple BSSID set. For example, if two logical APs in the AP multi-link device operate on one link, the two logical APs may belong to a same multiple BSSID set.

Figure 5:
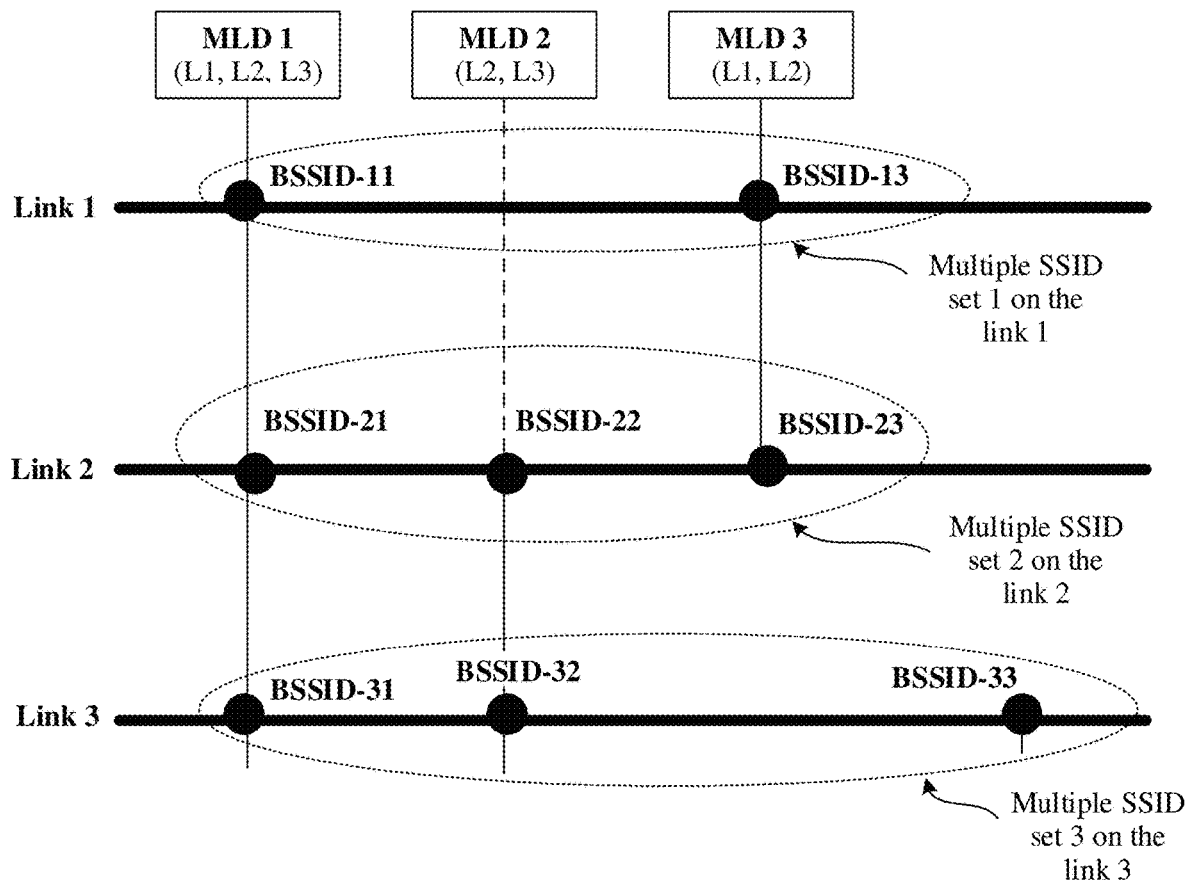
FIG. 5 is a schematic diagram of a multiple BSSID set framework based on MLD according to an embodiment of this application.

For example, as shown in FIG. 5, a MAC address of an AP multi-link device is, for example, an MLD 1. The multi-link device includes three logical APs, which are denoted as an AP 1, an AP 2, and an AP 3. The AP 1, the AP 2, and the AP 3 operate on a link 1, a link 2, and a link 3. MAC addresses of the AP 1, the AP 2 and the AP 3 are BSSID_11, BSSID_21, and BSSID_31 (before 802.11ax, a BSSID of a BSS established by an AP is a MAC address of the AP, and may be changed subsequently. For ease of description, an example in which the MAC address of the AP is the BSSID of the BSS established by the AP is used herein). The AP 1 is a member of a multiple BSSID set 1, and the multiple BSSID set 1 further includes an AP 4 whose MAC address is BSSID_13. The AP 2 is a member of a multiple BSSID set 2, and the multiple BSSID set 2 further includes an AP 5 whose MAC address is BSSID_22 and an AP 6 whose MAC address is BSSID_23. The AP 3 is a member of a multiple BSSID set 3, and the multiple BSSID set 3 further includes an AP 7 whose MAC address is BSSID_32 and an AP 8 whose MAC address is BSSID_33.

Step S402: The station receives the MLD information sent by the access point AP.

Specifically, after receiving the MLD information by the AP in a broadcast or unicast manner, the station parses the MLD information to obtain content in the MLD information, for example, the information about the reporting AP and the information about the reported AP in the MLD information. If the MLD information includes shared information and information about a virtual AP, the station also obtains the shared information and the information about the virtual AP through parsing. It may be understood that the station may learn, based on the content obtained by parsing the MLD information, a multiple BSSID set structure based on the AP multi-link device. After obtaining the multiple BSSID set structure based on the AP multi-link device, the STA may perform one or more of the following operations.

(1) Associate with one or more APs in the MLD in which the AP is located on one link. For example, in FIG. 6, after the station receives MLD information sent by an AP whose MAC address is BSSID-1x on a link 1, the station may choose to associate with the AP whose MAC address is BSSID-1x and an AP whose MAC address is BSSID-3x in an AP multi-link device MLD 1 in which the AP whose MAC address is BSSID-1x is located.

(2) Associate with an AP in another MLD other than the MLD in which the reporting AP is located on one link, where the AP in the another MLD belongs to a multiple BSSID set including an AP in the MLD in which the reporting AP is located. For example, in FIG. 6, after the station receives MLD information sent by an AP whose MAC address is BSSID-1x on a link 1, the station may choose to associate with an AP whose MAC address is BSSID-2x and an AP whose MAC address is BSSID-3y in an AP multi-link device MLD 2.

Optionally, association herein refers to exchanging one or more of a probe request frame and a probe response frame, an authentication request frame and an authentication response frame, and an association request frame or an association response frame.

The following exemplifies two optional multiple BSSID set architecture solutions applied to an AP multi-link device.

In the following, an AP that is in a BSS and that is identified by a transmitted BSSID is referred to as a transmitted AP (Transmitted BSSID AP), and an AP that is in a BSS and that is identified by a nontransmitted BSSID is referred to as a nontransmitted AP (nontransmitted BSSID AP).

Solution 1:

Transmitted BSSID APs in a plurality of multiple BSSID sets are not from a same AP multi-link device. In other words, a same AP multi-link device includes one transmitted BSSID AP belonging to a multiple BSSID set, and may further include one nontransmitted BSSID AP belonging to another multiple BSSID set. For example, an AP 1 in one AP multi-link device (MLD 1) is a transmitted BSSID AP in a multiple BSSID set 1, and an AP 2 in the AP multi-link device (MLD 1) is a nontransmitted BSSID AP in a multiple BSSID set 2. In this case, a network formed by multiple BSSIDs of the multi-link device is more flexible, and is more suitable for service requirements of different stations.

Figure 6:
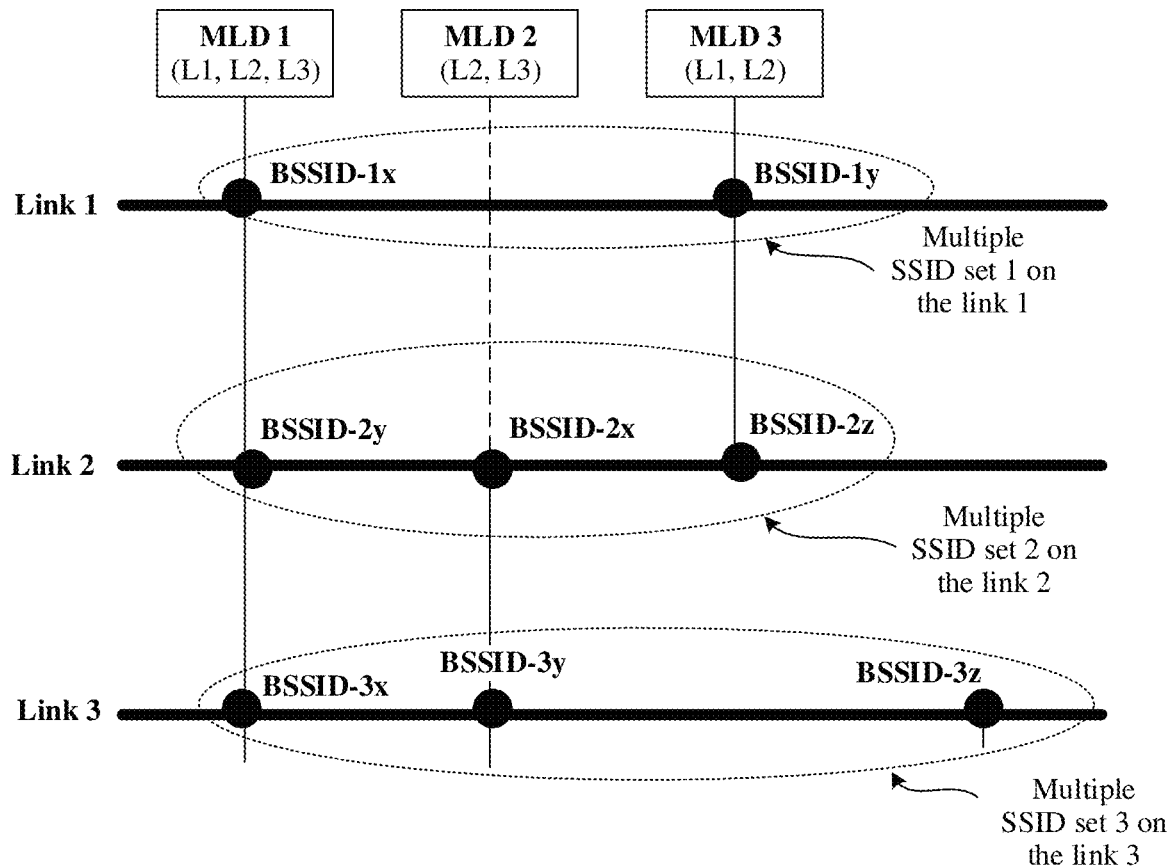
FIG. 6 is a schematic diagram of another multiple BSSID set framework based on MLD according to an embodiment of this application.

FIG. 6 shows an architecture in which APs in BSSs identified by transmitted BSSIDs in a plurality of multiple BSSID sets are not in a same AP multi-link device. An AP whose MAC address identifier ends with x is a transmitted BSSID AP, and an AP whose MAC address identifier ends with y or z is a nontransmitted BSSID AP. For example, a transmitted BSSID AP in the multiple BSSID set 1 is an AP 1 whose MAC address identifier is BSSID_1x, and a nontransmitted BSSID AP in the multiple BSSID set 1 is an AP 4 whose MAC address identifier is BSSID_1y. A transmitted BSSID AP in the multiple BSSID set 2 is an AP 5 whose MAC address identifier is BSSID_2x, and nontransmitted BSSID APs in the multiple BSSID set 2 are an AP 2 whose address identifier is BSSID_2y and an AP 6 whose MAC address identifier is BSSID_2z. A transmitted BSSID AP in the multiple BSSID set 3 is an AP 3 whose MAC address identifier is BSSID_3x, and nontransmitted BSSID APs in the multiple BSSID set 3 are an AP 7 whose MAC address identifier is BSSID_3y and an AP 8 whose MAC address identifier is BSSID_3z. It can be seen from FIG. 6 that transmitted BSSID APs (namely, transmitted APs) from different multiple BSSID sets are distributed in different AP multi-link devices, for example, the AP whose MAC address is BSSID-1x and the AP whose MAC address is BSSID-2x are respectively in the AP multi-link device MLD 1 and the AP multi-link device MLD 2.

In this embodiment of this application, there is further a virtual AP. The virtual AP and the reporting AP are not in a same AP multi-link device, and the virtual AP belongs to a same AP multi-link device as a nontransmitted AP in a multiple BSSID set to which the reporting AP belongs. In addition, no member AP belonging to the AP multi-link device in which the reporting AP is located exists on an operating link of the virtual AP, or a member AP belonging to the AP multi-link device in which the reporting AP is located exists on an operating link of the virtual AP but is not in a same multiple BSSID set as the virtual AP. For example, as shown in FIG. 6, a reporting AP in the multiple BSSID set 2 is the AP 5 (also a transmitted AP) whose MAC address is BSSID_2x. The AP 1 whose MAC address is BSSID_1x and the AP 5 are not in a same multi-link device, but the AP 1 and a nontransmitted AP whose MAC address is BSSID_2y in the multiple BSSID set 2 in which the AP 5 is located, namely, the AP 2, are in a same AP multi-link device (MLD 1). In addition, no member AP belonging to the AP multi-link device in which the reporting AP is located exists on an operating link of the AP 1. Therefore, for the AP 5 serving as the reporting AP, the AP 1 may be considered as a virtual AP. Certainly, the "virtual AP" herein may have another name, but should have the same meaning as that of the virtual AP herein.

In embodiments of this application, an AP that is in the AP multi-link device and that sends the MLD information may be referred to as a reporting AP, and an AP that does not send the MLD information may be referred to as a reported AP. Optionally, the reported AP and the reporting AP are located in a same AP multi-link device. Optionally, the reported AP and the reported AP are not located in the same AP multi-link device. In an example, currently there is one reporting AP and at least one reported AP in the AP multi-link device (when a quantity of reported APs is 0, the AP multi-link device may be considered as a special AP multi-link device). The reported AP and the reporting AP are in the same multi-link AP. In another example, the AP multi-link device may also include one logical AP, where the logical AP switches between multiple links for operating. When the logical AP sends MLD information, the logical AP is a reporting AP. The management frame may be a beacon frame, a probe response frame, or an association response frame. The MLD information is carried in the management frame, or another pre-specified frame. Therefore, that an access point sends MLD information to a station may be specifically: The reporting AP sends the MLD information to the station. The MLD information indicates, to the station, information that is based on distribution of a multi-link device and a multiple BSSID set in the station, so that the station learns of information about an MLD in which the first station is located.

The MLD information may be carried in the management frame, and the MLD information may include the following information: the information about the reporting AP and the information about the reported AP, and optionally, further include the information about the virtual AP and the shared information.

The information about the reporting AP includes a BSSID (generally a MAC address of the reporting AP) of a BSS to which the reporting AP belongs. In addition, if the reporting AP is a member of a multiple BSSID set, the information about the reporting AP needs to carry a multiple BSSID element of the multiple BSSID set to which the reporting AP belongs. The multiple BSSID element of the multiple BSSID set to which the reporting AP belongs carries information about some APs, and the information about these APs may be referred to as second-type AP information of the reporting AP.

Optionally, the information about the reporting AP further includes first-type AP information, and the first-type AP information in the information about the reporting AP is information of the reporting AP. For example, the first-type AP information further includes but is not limited to one or more of capability information of the reporting AP, operation information of the reporting AP, a MAC address of the reporting AP, a link identifier of the reporting AP, and the like. Optionally, if the MLD information is carried in the beacon frame, the information about the reporting AP may further include some other fields or elements carried in a beacon frame in the current 802.11 protocol (for example, the 802.11-2016 protocol), for example, a timestamp field, a beacon interval field, an SSID element, and so on. Optionally, if the MLD information is carried in the probe response frame, the reporting AP may further include some other fields or elements carried in the beacon frame in the current 802.11 protocol (for example, the 802.11-2016 protocol), for example, a timestamp field, a beacon interval field, an SSID element, and so on. Optionally, if the MLD information is carried in the association request frame, the information about the reporting AP may further include some other fields or elements carried in an association request frame in the current 802.11 protocol (for example, the 802.11-2016 protocol), for example, an association identifier (AID) field, an enhanced distributed channel access (EDCA) parameter set element, and so on.

Information about the reported AP: Manner 1: The information about the reported AP includes first-type AP information, and the first-type AP information includes information about one of APs other than the reported AP in an MLD in which the reported AP is located. If the reported AP indicated in the information about the reported AP is a member of a multiple BSSID set, optionally the information about the reported AP further includes a multiple BSSID element of the multiple BSSID set to which the reported AP belongs. Optionally, the information about the reported AP further includes related information of a multiple BSSID in which the reported AP is located. The related information of the multiple BSSID in which the reported AP is located may indicate, by using a first preset bit, whether the reported AP is a member of the multiple BSSID set. For example, the first preset bit includes one bit, and whether the reported AP is a member of the multiple BSSID set is indicated by using one bit. The multiple BSSID element of the multiple BSSID set to which the reported AP belongs carries information about some APs, and the information about these APs may be referred to as second-type AP information of the reported AP.

In the information about the reported AP, if an indicated reported AP is a nontransmitted BSSID AP, the related information of the multiple BSSID further includes information about a transmitted BSSID AP in the multiple BSSID set to which the reported AP belongs, or a transmitted BSSID, or a sequence number of the transmitted BSSID in the multiple BSSID set. Optionally, the transmitted BSSID AP information may further include one or more of capability information, operation information, a MAC address, a link identifier of the transmitted BSSID AP, and a MAC address of an AP multi-link device in which the transmitted BSSID AP is located.

Optionally, the related information of the multiple BSSID in which the reported AP is located may further indicate, by using a second preset bit, an AP type of the reported AP in the multiple BSSID set to which the reported AP belongs. For example, the second preset bit is two bits, and the two bits separately indicate whether the AP belongs to a multiple BSSID set, and whether the reported AP is a transmitted BSSID AP; or the second preset bit is one bit, and the one bit indicates whether the reported AP is a nontransmitted BSSID AP.

Optionally, certainly, the related information of the multiple BSSID may further indicate, by using two bits, whether the reported AP belongs to the multiple BSSID set, and further indicate a type of a reported AP in the multiple BSSID set to which the reported AP belongs. For example, one of the two bits indicates whether the reported AP belongs to the multiple BSSID set, and the other bit indicates the type of the reported AP in the multiple BSSID set to which the reported AP belongs, for example, whether the reported AP is a transmitted BSSID AP or a nontransmitted BSSID AP.

It should be noted that, if the multiple BSSID element is in the information about the reported AP, a nontransmitted BSSID profile of the multiple BSSID element may further carry a MAC address of an MLD in which the nontransmitted BSSID AP is located. Specifically, if the nontransmitted BSSID AP belongs to an MLD, a MAC address of the MLD in which the AP is located is added to the nontransmitted BSSID profile. Otherwise, the MAC address may be omitted. The MAC address of the MLD to which the nontransmitted BSSID AP belongs may be used by another station to associate with an AP in the MLD to which the nontransmitted BSSID AP belongs.

Optionally, the related information of the multiple BSSID included in the information about the reported AP may be in a multiple BSSID element in an information field of the reported AP, for example, in an optional subelement field in the multiple BSSID element.

Optionally, the related information of the multiple BSSID included in the information about the reported AP may be in another field (not in the multiple BSSID element) of the reported AP.

Manner 2: Case 1: The reported AP does not belong to a multiple BSSID set. In this case, the first-type AP information in an information field of the reported AP is information about an AP that belongs to the same MLD as the reporting AP. Case 2: If the reported AP belongs to a multiple BSSID set, the first-type AP information is information about a transmitted BSSID AP in the multiple BSSID set, and an information field of the reported AP further includes a multiple BSSID element. In this case, the multiple BSSID element carries the second-type AP information. Case 2 is further divided into two cases. Case 2.1: The transmitted BSSID AP and the reporting AP are in a same MLD. Case 2.2: The transmitted BSSID AP and the reporting AP are not in a same MLD.

For case 2.2, the reported AP information field further includes information about an AP that satisfies the following conditions:
  (1) The AP and the reporting AP are located in a same AP multi-link device; and
  (2) the AP and the transmitted BSSID AP in the information about the reported AP are located in a same multiple BSSID set.

Information about the AP that satisfies the conditions is a BSSID or a multiple BSSID-index of the multiple BSSID set to which the AP belongs.

In the manner 2, the information field of the reported AP includes 1-bit information to indicate whether the reported AP belongs to the multiple BSSID set, and further includes 1-bit information to indicate whether the reported AP and the reporting AP are in a same MLD.

In the manner 2, if the reported AP belongs to the multiple BSSID set, the first-type AP information included in the information field of the reported AP is information about the transmitted BSSID AP, and a structure of signaling is consistent with that of an information field of a virtual AP.

Optionally, for example, the first-type AP information includes one or more of a capability element of the reported AP, operation information of the reported AP, a MAC address of the reported AP, a link identifier of the reported AP, and the like. The link identifier may be an identifier number. Alternatively, the link identifier may be an operating class and a channel number of the reported AP. Alternatively, the link identifier may be a MAC address of the reported AP. Alternatively, the link identifier may be a combination of at least two of the foregoing items (for example, the identifier number, the operating class of the reported AP, the channel number, and the MAC address of the reported AP). In the sent MLD information, the reporting AP may perform a one-to-one correspondence between the identifier and the operating class and the channel number, or a one-to-one correspondence between the identifier and the MAC address of the reported AP, or a one-to-one correspondence between the identifier and the combination of at least two items in advance. Certainly, the correspondence may also be determined through negotiation between the reporting AP and the station in advance.

Information about the virtual AP: if an AP indicated in the information about the virtual AP is a member of a multiple BSSID set, an information field of the virtual AP includes first-type AP information, namely, information about a transmitted BSSID AP (in other words, the virtual AP is considered as a transmitted BSSID AP in the multiple BSSID set to which the virtual AP belongs), and a multiple BSSID element of the multiple BSSID set to which the virtual AP belongs. Optionally, the information about the virtual AP further includes related information of the multiple BSSID in which the virtual AP is located. The related information of the multiple BSSID on which the virtual AP is located may indicate, by using a third preset bit, whether the virtual AP is a member of the multiple BSSID set. For example, the third preset bit includes one bit, and the bit indicates whether the virtual AP belongs to the multiple BSSID set.

The multiple BSSID element of the multiple BSSID set to which the virtual AP belongs carries information about some APs, and the information about these APs may be referred to as second-type AP information of the virtual AP.

If an AP indicated in the information about the virtual AP is not a member of a multiple BSSID set, the information field of the virtual AP includes first-type AP information, specifically, information about the virtual AP itself.

Optionally, the related information of the multiple BSSID in which the virtual AP is located may further indicate, by using a fourth preset bit, an AP type of the virtual AP in the multiple BSSID set to which the virtual AP belongs. For example, the fourth preset bit is 2 bits, and the 2 bits separately indicate whether the AP belongs to a multiple BSSID set, and whether the virtual AP is a transmitted BSSID AP; or the fourth preset bit is one bit, and the one bit indicates whether the virtual AP is a nontransmitted BSSID AP.

Optionally, certainly, the related information of the multiple BSSID may further indicate, by using two bits, whether the virtual AP belongs to the multiple BSSID set, and further indicate a type of the virtual AP in the multiple BSSID set to which the virtual AP belongs. For example, one of the two bits indicates whether the virtual AP belongs to the multiple BSSID set, and the other bit indicates the type of the virtual AP in the multiple BSSID set to which the virtual AP belongs, for example, whether the virtual AP is a transmitted BSSID AP or a nontransmitted BSSID AP.

It should be noted that, if the multiple BSSID element is in the information about the virtual AP, a nontransmitted BSSID profile of the multiple BSSID element may further carry a MAC address of an MLD in which the nontransmitted BSSID AP is located. Specifically, if the nontransmitted BSSID AP belongs to an MLD, a MAC address of the MLD in which the AP is located is added to the nontransmitted BSSID profile. Otherwise, the MAC address may be omitted. The MAC address of the MLD to which the nontransmitted BSSID AP belongs may be used by another station to associate with an AP in the MLD to which the nontransmitted BSSID AP belongs.

Optionally, the related information of the multiple BSSID included in the information about the virtual AP may be in a multiple BSSID element in an information field of the virtual AP, for example, in an optional subelement field in the multiple BSSID element.

Optionally, for example, the first-type AP information includes one or more of a capability element of the virtual AP, operation information of the virtual AP, a MAC address of the virtual AP, a link identifier of the virtual AP, a MAC address of an AP multi-link device (MLD) on which the virtual AP is located, and the like. The link identifier may be an identifier number, or an operating class and a channel number, or a MAC address of the virtual AP, or a combination of at least two of the foregoing items. In the sent MLD information, the reporting AP may perform a one-to-one correspondence between the identifier and the operating class and the channel number of the virtual AP, or a one-to-one correspondence between the identifier and the MAC address of the virtual AP, or a one-to-one correspondence between the identifier and the combination of at least two items in advance. Certainly, the correspondence may also be determined through negotiation between the reporting AP and the station in advance.

The first-type AP information mentioned above is all carried outside the multiple BSSID element of the multiple BSSID set, and the second-type AP information mentioned above is all carried in the multiple BSSID element of the multiple BSSID set.

The shared information specifically includes at least two pieces of shared information of the reporting AP, the reported AP, the virtual AP, and the like. For example, the reporting AP and the reported AP are located in a same AP multi-link device MLD 2, and both have a MAC address of the AP multi-link device MLD 2. Therefore, the shared information may include the MAC address of the multi-link device MLD 2. In addition, both a quantity of reported APs and a quantity of virtual APs may be classified as the shared information. It should be noted that, when a part of shared information is not carried in the shared information, the part of shared information may be carried in the information about the reporting AP, the information about the reported AP, or the information about the virtual AP. For example, the MAC address of the AP multi-link device MLD 2 in which both the reporting AP and the reported AP are located may be carried in the information about the reporting AP, and/or carried in the information about the reported AP.

Optionally, the MLD information may not include the shared information. In this case, some examples of information included in the shared information herein may be alternatively carried in the information about the reporting AP, the information about the reported AP, or the information about the virtual AP.

Optionally, in this embodiment of this application, the information field of the reported AP and the information field of the virtual AP may be distinguished in the following manners.

In an example, the information field of the reported AP and the information field of the virtual AP are implicitly indicated by a quantity of reported APs and a quantity of virtual APs in a shared information field. In this case, information fields of one or more reported APs are consecutive, and information fields of one or more virtual APs are consecutive. In an example, when the MLD information includes the information about the reporting AP, the information about the reported AP, the information about the virtual AP, and the shared information, a field structure of the MLD information may be shown in Table 4.

TABLE 4

| Information about a reporting AP | Shared information | Information about one or more reported APs | Information about zero, one, or more virtual APs |
| --- | --- | --- | --- |

As shown in Table 4, it is assumed that the shared information indicates that the quantity of reported APs is 2 and the quantity of virtual APs is 3. Therefore, two information fields after the shared information include information about the two reported APs, and three information fields after the two information fields include information about three virtual APs. Then, after reading the two information fields after the shared information, the station that receives the MLD information knows that the two fields are the information about the reported APs. After reading the three information fields after the two information fields, the station knows that the three fields are the information about the virtual APs.

In another example, preset bit information is carried in an information field to indicate whether a current information field is an information field of the reported AP or an information field of the virtual AP. The preset bit information may be 1 bit. For example, if a value of the 1 bit is 1, it indicates that the current information field is an information field of the reported AP; if a value of the 1 bit is 0, it indicates that the current information field is an information field of the virtual AP. Alternatively, the preset bit information may be a special value of a field. Some values (for example, 1100) of the field indicate that the current information field is an information field of the reported AP, and some other values (0011) indicate that the current information field is an information field of the virtual AP. Therefore, the information about the reported AP or the information about the virtual AP may be determined based on the special value of the field. In this manner, the MLD information may not indicate the quantity of reported APs or the quantity of virtual APs, to reduce signaling overheads. In addition, one or more information fields of reported APs do not need to be consecutive, and one or more information fields of virtual APs do not need to be consecutive. Locations of information fields of the reported APs and information fields of the virtual APs in the MLD information are more flexible. Certainly, the MLD information in this example may also use a structure shown in Table 2.

With reference to the structure shown in FIG. 6, the following describes examples of transmitted BSSID information and the multiple BSSID element carried in the information about the reporting AP, the information about the reported AP, and the information about the virtual AP. Details are as follows.

Example 1: If the reporting AP is an AP whose MAC address is BSSID-2x, one reported AP is an AP whose MAC address is BSSID-3y, and one virtual AP is an AP whose MAC address is BSSID-1x.

The reporting AP whose MAC address is BSSID-2x is a member of the multiple BSSID set 2, and an AP whose MAC address is a BSSID-2x is a transmitted BSSID AP in the multiple BSSID set 2. Therefore, the information about the reporting AP includes first-type AP information and second-type AP information. The first-type AP information includes the MAC address BSSID-2x (namely, a transmitted BSSID). The second-type AP information includes a multiple BSSID element of the multiple BSSID set 2, and the multiple BSSID element includes information about an AP whose MAC address is a BSSID-2y and information about the AP whose MAC address is BSSID-2z.

The reported AP whose MAC address is BSSID-3y is a member of the multiple BSSID set 3, and the related information of the multiple BSSID indicates that the AP whose MAC address is BSSID-3y is a nontransmitted BSSID AP. Therefore, the information about the reported AP includes the first-type AP information, the second-type AP information, and information about a transmitted BSSID AP in the multiple BSSID set 3 in which the AP whose MAC address is BSSID-3y is located, namely, information about an AP whose MAC address is BSSID-3x. The first-type AP information includes a MAC address of the reported AP whose MAC address is BSSID-3y, and the like. The second-type AP information carries the multiple BSSID element of the multiple BSSID set 3 in which the AP whose MAC address is BSSID-3y is located, and the multiple BSSID element carries information about an AP whose MAC address is BSSID-3z.

The virtual AP whose MAC address is BSSID-1x is a member of the multiple BSSID set 1, and the AP whose MAC address is BSSID-1x is a transmitted BSSID AP in the multiple BSSID set 1. Therefore, the information about the virtual AP includes first-type AP information and second-type AP information, where the first-type AP information includes the MAC address BSSID-1x, the second-type AP information includes a multiple BSSID element of the multiple BSSID set 1, and the multiple BSSID element includes information about an AP whose MAC address is BSSID-1y.

Example 2: If the reporting AP is an AP whose MAC address is BSSID-1x, one reported AP is an AP whose MAC address is BSSID-2y, and another reported AP is an AP whose MAC address is BSSID-3x. In addition, the AP with the MAC address BSSID-1x does not have a corresponding virtual AP.

Because the reporting AP whose MAC address is BSSID-1x is a member of the multiple BSSID set 1, and the AP whose MAC address is BSSID-1x is a transmitted BSSID AP in the multiple BSSID set 1, the information about the reporting AP includes the first-type AP information and the second-type AP information. The first-type AP information includes the MAC address BSSID-1x (namely, a transmitted BSSID), the second-type AP information includes the multiple BSSID element of the multiple BSSID set 1, and the multiple BSSID element includes information about an AP whose MAC address is BSSID-1y.

The reported AP whose MAC address is BSSID-2y is a member of the multiple BSSID set 3, and the related information of the multiple BSSID indicates that the AP whose MAC address is BSSID-2y is a nontransmitted BSSID AP. Therefore, the information about the reported AP includes the first-type AP information, the second-type AP information, and information about a transmitted BSSID AP in the multiple BSSID set 2 in which the AP whose MAC address is BSSID-2y is located, namely, information about an AP whose MAC address is BSSID-2x. The first-type AP information includes a MAC address whose MAC address is BSSID-2y, and the like. The second-type AP information includes a multiple BSSID element of a multiple BSSID set 2 in which an AP whose MAC address is BSSID-2y is located. The multiple BSSID element includes information about the AP whose MAC address is BSSID-2y, and information about the AP whose MAC address is BSSID-2z.

The reported AP whose MAC address is BSSID-3x is a member of the multiple BSSID set 3, and the related information of the multiple BSSID indicates that the AP whose MAC address is BSSID-3x is a transmitted BSSID AP. Therefore, the information about the reported AP includes the first-type AP information, the second-type AP information, and a MAC address BSSID-3x (namely, a transmitted BSSID) of an AP whose MAC address is BSSID-3x. The first-type AP information includes a MAC address of a reported AP whose MAC address is BSSID-3x, and the like. The second-type AP information includes a multiple BSSID element of a multiple BSSID set 3 in which the AP whose MAC address is BSSID-3x is located. The multiple BSSID element includes information about an AP whose MAC address is BSSID-3y and information about an AP whose MAC address is BSSID-3z.

When the AP whose MAC address is BSSID-1x serves as a reporting AP, there is no corresponding virtual AP. Therefore, the MLD information does not include information about a virtual AP. It may be understood that, for the foregoing two examples, optionally, the MLD information may further include the shared information. For content of the shared information, refer to the foregoing descriptions. Details are not described herein again.

Solution 2:

Transmitted BSSID APs in a plurality of multiple BSSID sets belong to a same AP multi-link device. In other words, if one or more APs in the AP multi-link device belong to a multiple BSSID set, all the transmitted BSSID APs in the multiple BSSID set belong to one AP multi-link device. For example, a transmitted BSSID AP1 in the multiple BSSID set 1 and a transmitted BSSID AP2 in the multiple BSSID set 2 belong to two different APs in the AP multi-link device MLD 1. In this case, the multiple BSSID network constructed based on the AP multi-link device is simpler, and signaling MLD information overheads are less.

Figure 7:
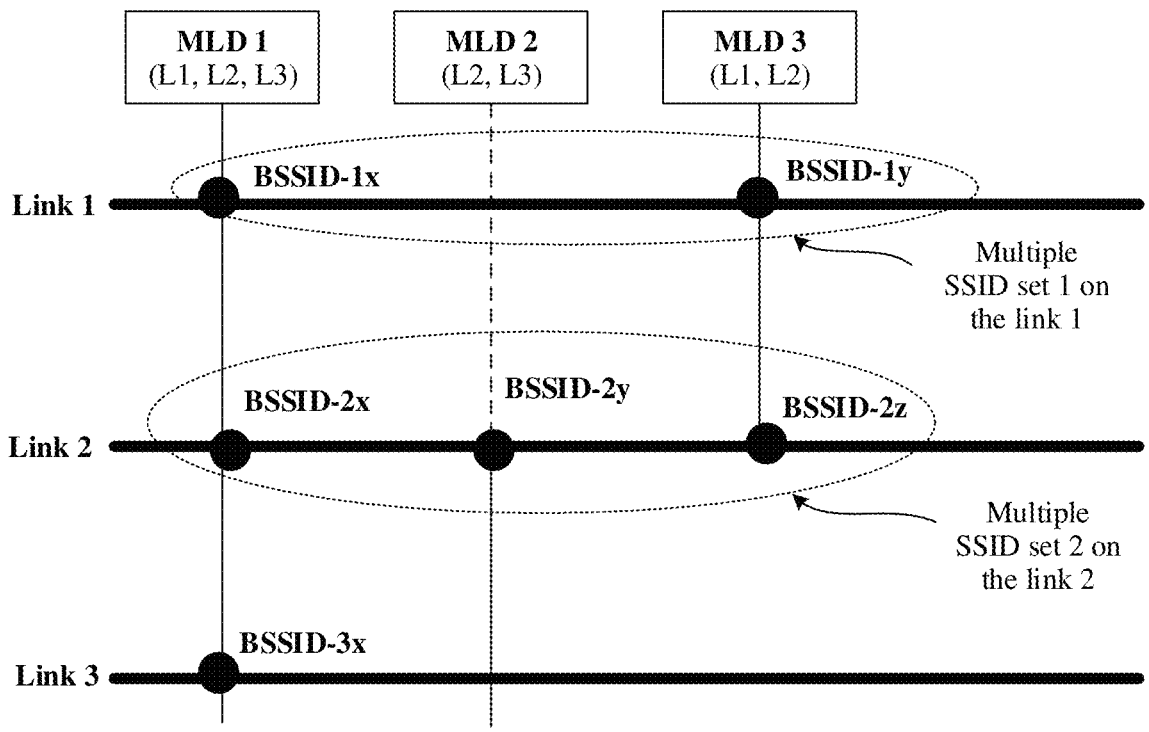
FIG. 7 is a schematic diagram of another multiple BSSID set framework based on MLD according to an embodiment of this application.

FIG. 7 shows that APs in BSSs identified by transmitted BSSIDs in a plurality of multiple BSSID sets are from a same AP multi-link device. An AP whose MAC address identifier ends with x is a transmitted BSSID AP, and an AP whose MAC address identifier ends with y or z is a nontransmitted BSSID AP. For example, a transmitted BSSID AP in the multiple BSSID set 1 is an AP1 whose MAC address identifier is BSSID_1x, and a nontransmitted BSSID AP in the multiple BSSID set 1 is an AP4 whose MAC address identifier is BSSID_1y. A transmitted BSSID AP in the multiple BSSID set 2 is an AP2 whose MAC address identifier is BSSID_2x, and nontransmitted BSSID APs in the multiple BSSID set 2 are an AP5 whose address identifier is BSSID_2y and an AP6 whose MAC address identifier is BSSID_2z. A transmitted BSSID AP in the multiple BSSID set 3 is an AP3 whose MAC address identifier is BSSID_3x, and nontransmitted BSSID APs in the multiple BSSID set 3 are an AP7 whose MAC address identifier is BSSID_3y and an AP8 whose MAC address identifier is BSSID_3z. It can be learned from FIG. 7 that transmitted BSSID APs (namely, transmitted APs) from different multiple BSSID sets are all in an AP multi-link device MLD 1.

In embodiments of this application, an AP that is in the AP multi-link device and that sends the MLD information may be referred to as a reporting AP, an AP that does not send the MLD information may be referred to as a reported AP, and the reported AP and the reporting AP are located in the same AP multi-link device. In an example, currently there is one reporting AP and at least one reported AP in the AP multi-link device (when a quantity of reported APs is 0, the AP multi-link device may be considered as a special AP multi-link device). The reported AP and the reporting AP are in the same multi-link AP. In another example, the AP multi-link device may also include one logical AP, where the logical AP switches between multiple links for operating. When the logical AP sends MLD information, the logical AP is a reporting AP. The management frame may be a beacon frame, a probe response frame, or an association response frame. The MLD information is carried in the management frame, or another pre-specified frame. Therefore, that an access point sends MLD information to a station may be specifically: the reporting AP sends the MLD information to the station. The MLD information indicates, to the station, information that is based on distribution of a multi-link device and a multiple BSSID set in the station, so that the station learns of information about an MLD in which the first station is located.

The MLD information may be carried in the management frame, and the MLD information may include the following information: the information about the reporting AP and the information about the reported AP, and optionally, further include the information about the virtual AP and the shared information.

The information about the reporting AP includes a BSSID (generally a MAC address of the reporting AP) of a BSS to which the reporting AP belongs. In addition, if the reporting AP is a member of a multiple BSSID set, the information about the reporting AP needs to carry a multiple BSSID element of the multiple BSSID set to which the reporting AP belongs. The multiple BSSID element of the multiple BSSID set to which the reporting AP belongs carries information about some APs, and the information about these APs may be referred to as second-type AP information of the reporting AP.

Optionally, the information about the reporting AP further includes first-type AP information, and the first-type AP information in the information about the reporting AP is information of the reporting AP. For example, the first-type AP information further includes one or more of capability information of the reporting AP, operation information of the reporting AP, a MAC address of the reporting AP, a link identifier of the reporting AP, and the like. Optionally, if the MLD information is carried in the beacon frame, the information about the reporting AP may further include some other fields or elements carried in a beacon in the current 802.11 protocol (for example, the 802.11-2016 protocol), for example, a timestamp field, a beacon interval field, an SSID element, and so on. Optionally, if the MLD information is carried in the probe response frame, the reporting AP may further include some other fields or elements carried in the beacon in the current 802.11 protocol (for example, the 802.11-2016 protocol), for example, a timestamp field, a beacon interval field, an SSID element, and so on. Optionally, if the MLD information is carried in the association request frame, the information about the reporting AP may further include some other fields or elements carried in an association request frame in the current 802.11 protocol (for example, the 802.11-2016 protocol), for example, an association identifier (AID) field, an enhanced distributed channel access (EDCA) parameter set element, and so on.

The information about the reported AP includes a BSSID (usually, a MAC address of the reported AP) of a BSS to which the reported AP belongs. In addition, if the reported AP indicated in the information about the reported AP belongs to a multiple BSSID set, the information about the reported AP includes a multiple BSSID element of the multiple BSSID set to which the reported AP belongs. Under the premise of the foregoing architecture, the reported AP is essentially a transmitted BSSID AP. Optionally, the information about the reported AP further includes related information of a multiple BSSID in which the reported AP is located. The related information of the multiple BSSID in which the reported AP is located may indicate, by using a first preset bit, whether the reported AP is a member of the multiple BSSID set. For example, the first preset bit includes one bit, and whether the reported AP is a member of the multiple BSSID set is indicated by using one bit. The multiple BSSID element of the multiple BSSID set to which the reported AP belongs carries information about some APs, and the information about these APs may be referred to as second-type AP information of the reported AP. It should be noted that, if the multiple BSSID element is in the information about the reported AP, a nontransmitted BSSID profile of the multiple BSSID element may further carry a MAC address of an MLD in which the nontransmitted BSSID AP is located. Specifically, if the nontransmitted BSSID AP belongs to an MLD, a MAC address of the MLD in which the AP is located is added to the nontransmitted BSSID profile. Otherwise, the MAC address may be omitted. The MAC address of the MLD to which the nontransmitted BSSID AP belongs may be used by another station to associate with an AP in the MLD to which the nontransmitted BSSID AP belongs.

Optionally, the related information of the multiple BSSID included in the information about the reported AP may be in the multiple BSSID element in an information field of the reported AP, for example, in an optional subelement field in the multiple BSSID element.

Optionally, the related information of the multiple BSSID included in the information about the reported AP may be in another field (not in the multiple BSSID element) of the reported AP.

Optionally, the information about the reported AP further includes first-type AP information. The first-type AP information in the information about the reported AP is information about the reported AP. For example, the first-type AP information includes one or more of a capability element of the reported AP, operation information of the reported AP, a MAC address of the reported AP, a link identifier of the AP, and the like. The link identifier may be an identifier number. Alternatively, the link identifier may be an operating class and a channel number of the reported AP. Alternatively, the link identifier may be a MAC address of the reported AP. Alternatively, the link identifier may be a combination of at least two of the foregoing items (for example, the identifier number, the operating class of the reported AP, the channel number, and the MAC address of the reported AP). In the sent MLD information, the reporting AP may perform a one-to-one correspondence between the identifier and the operating class and the channel number, or a one-to-one correspondence between the identifier and the MAC address of the reported AP, or a one-to-one correspondence between the identifier and the combination of at least two items in advance. Certainly, the correspondence may also be determined through negotiation between the reporting AP and the station in advance.

The shared information specifically includes at least two pieces of shared information of the reporting AP, the reported AP, and the like. For example, the reporting AP and the reported AP are located in a same AP multi-link device MLD 2, and both have a MAC address of the AP multi-link device MLD 2. Therefore, the shared information may include the MAC address of the multi-link device MLD 2. In addition, the quantity of reported APs may be classified as the shared information. It should be noted that, when a part of shared information is not carried in the shared information, the part of shared information may be carried in the information about the reporting AP or the information about the reported AP. For example, the MAC address of the AP multi-link device MLD 2 in which both the reporting AP and the reported AP are located may be carried in the information about the reporting AP, and/or carried in the information about the reported AP.

Optionally, the shared information may further carry a quantity of information fields of reported APs.

Optionally, the MLD information may not include the shared information. In this case, some examples of information included in the shared information herein may be alternatively carried in the information about the reporting AP or the information about the reported AP.

Optionally, when the MLD information includes the information about the reporting AP, the information about the reported AP, and the shared information, a field structure of the MLD information may be shown in Table 5.

TABLE 5

| Information about a reporting AP | Shared information | Information about one or more reported APs |
| --- | --- | --- |

With reference to the structure shown in FIG. 7, the following describes examples of transmitted BSSID information and the multiple BSSID element carried in the information about the reporting AP and the information about the reported AP. Details are as follows.

If the reporting AP is an AP whose MAC address is BSSID-1x, one reported AP is an AP whose MAC address is BSSID-2x, and another reported AP is an AP whose MAC address is BSSID-3x.

Because the reporting AP whose MAC address is BSSID-1x is a member of the multiple BSSID set 1, and the AP whose MAC address is BSSID-1x is a transmitted BSSID AP in the multiple BSSID set 1, the information about the reporting AP includes the first-type AP information and the second-type AP information. The first-type AP information includes the MAC address BSSID-1x (namely, a transmitted BSSID), the second-type AP information includes the multiple BSSID element of the multiple BSSID set 1, and the multiple BSSID element includes information about an AP whose MAC address is BSSID-1y.

A BSSID of a BSS to which the reported AP whose MAC address is BSSID-2x belongs is a transmitted BSSID and is a member of the multiple BSSID set 2, information about the reported AP includes first-type AP information and second-type AP information. The first-type AP information includes the MAC address BSSID-2x (that is, the transmitted BSSID), and the second-type AP information includes a multiple BSSID element of the multiple BSSID set 2, where the multiple BSSID element includes information about an AP whose MAC address is BSSID-2y, and information about an AP whose MAC address is BSSID-2z.

Because the reported AP whose MAC address is BSSID-3x does not belong to any multiple BSSID set, the foregoing information about the reported AP does not need to carry related information of a multiple BSSID set whose MAC address is BSSID-3x.

In an optional solution, in the foregoing solution 1 and solution 2, that the information about the reported AP is included in the information field of the reported AP and the information about the virtual AP is included in the information field of the virtual AP further includes a method of inheriting the information field of the reporting AP. The principle of inheriting is similar to the method for the nontransmitted BSSID AP to inherit the Transmitted BSSID AP parameter in the prior art.

Specifically, the information field of the reporting AP includes relatively comprehensive parameters, including various elements in the current 802.11 beacon frame. If a part of the information about the reported AP is the same as a part of the information about the reporting AP, and the same information is carried in the information field of the reporting AP, an element corresponding to the same information may not appear in the information field of the reported AP. If a part of the information about the reported AP is different from a part of the information about the reporting AP, an element corresponding to the different information may appear in the information field of the reported AP, or a non-inherited element shown in Table 3 is used for indication. If the information field of the reported AP indicates that the reported AP belongs to a multiple BSSID set, a part of information about a nontransmitted BSSID AP in the multiple BSSID set may inherit the information field of the reporting AP, or inherit a part of information about a transmitted BSSID AP in the multiple BSSID set. For a principle of inheriting, refer to the foregoing method for inheriting the information field of the reported AP.

If a part of the information about the virtual AP is the same as a part of the information about the reporting AP, and the same information is carried in the information field of the reporting AP, an element corresponding to the same information may not appear in the information field of the virtual AP. If a part of the information about the virtual AP is different from a part of the information about the reporting AP, an element corresponding to the different information may appear in the information field of the virtual AP, or a non-inherited element shown in Table 3 is used for indication. If the information field of the virtual AP indicates that the virtual AP belongs to a multiple BSSID set, a part of information about a nontransmitted BSSID AP in the multiple BSSID set may inherit the information field of the reporting AP, or inherit a part of information about a transmitted BSSID AP in the multiple BSSID set. For a principle of inheriting, refer to the foregoing method for inheriting the information field of the reported AP.

Optionally, on the premise of the foregoing solution 1, in step S402, a manner in which the station determines a structure of the multiple BSSID set is as follows.

The multiple BSSID set that the reporting AP belongs: When the reporting AP is a member of the multiple BSSID set, the reporting AP is usually a transmitted BSS ID AP. Therefore, a BSSID of the reporting AP included in the information about the reporting AP is actually a transmitted BSSID. In addition, because the information about the reporting AP needs to carry a multiple BSSID element of the multiple BSSID set to which the reporting AP belongs, the receive end may determine, based on the transmitted BSSID and the multiple BSSID element of the multiple BSSID set to which the reporting AP belongs (specifically, a maximum BSSID indication and a non-transmission BSSID profile of the multiple BSSID set to which the reporting AP belongs), a nontransmitted BSSID in the multiple BSSID set to which the reporting AP belongs, to obtain the structure of the multiple BSSID set to which the reporting AP belongs.

The multiple BSSID set to which the reported AP belongs: The information about the reported AP carries related information of a transmitted BSSID (such as transmitted BSSID AP information, a transmitted BSSID, and a sequence number of the transmitted BSSID in the multiple BSSID set) and a multiple BSSID element of the multiple BSSID set to which the reported AP belongs. Therefore, the receive end may determine, based on the transmitted BSSID and the multiple BSSID element of the multiple BSSID set to which the reported AP belongs (specifically, a maximum BSSID indication and a non-transmission BSSID profile of the multiple BSSID set to which the reported AP belongs), a nontransmitted BSSID in the multiple BSSID set to which the reported AP belongs, to obtain a structure of the multiple BSSID set to which the reported AP belongs.

Optionally, if the information field of the virtual AP exists, for the multiple BSSID set to which the virtual AP belongs: The information about the virtual AP carries information about a transmitted BSSID AP and a multiple BSSID element of the multiple BSSID set to which the virtual AP belongs. Therefore, the receive end may determine, based on the transmitted BSSID and the multiple BSSID element of the multiple BSSID set to which the virtual AP belongs (specifically, a maximum BSSID indication and a non-transmission BSSID profile of the multiple BSSID set to which the virtual AP belongs), a nontransmitted BSSID in the multiple BSSID set to which the virtual AP belongs, to obtain a structure of the multiple BSSID set to which the virtual AP belongs.

Optionally, the reporting AP, the reported AP, and the virtual AP may not belong to a multiple BSSID set.

Optionally, structures of the multiple BSSID elements of the multiple BSSID sets in which the reporting AP, the reported AP, and the virtual AP are located may be in a form of Table 1 and Table 2, and certainly may be in another form. For example, some fields are added, some fields are deleted, or a structure sequence of some fields is changed based on the structures shown in Table 1 and Table 2.

Optionally, on the premise of the foregoing solution 2, in step S402, a manner in which the station determines a structure of the multiple BSSID set may be as follows.

The multiple BSSID set that the reporting AP belongs: When the reporting AP is a member of the multiple BSSID set, the reporting AP is usually a transmitted BSSID AP. Therefore, a BSSID of the reporting AP included in the information about the reporting AP is actually a transmitted BSSID. In addition, because the information about the reporting AP needs to carry a multiple BSSID element of the multiple BSSID set to which the reporting AP belongs, the receive end may determine, based on the transmitted BSSID and the multiple BSSID element of the multiple BSSID set to which the reporting AP belongs (specifically, a maximum BSSID indication and a non-transmission BSSID profile of the multiple BSSID set to which the reporting AP belongs), a nontransmitted BSSID in the multiple BSSID set to which the reporting AP belongs, to obtain the structure of the multiple BSSID set to which the reporting AP belongs.

The multiple BSSID set to which the reported AP belongs: Because the information about the reported AP carries a BSSID of a BSS to which the reported AP belongs, and the reported AP is a transmitted AP, the BSSID of the BSS to which the reported AP belongs is a transmitted BSSID in the multiple BSSID set to which the reported AP belongs. Therefore, the receive end may determine, based on the transmitted BSSID and the multiple BSSID element of the multiple BSSID set to which the reported AP belongs (specifically, a maximum BSSID indication and a non-transmission BSSID profile of the multiple BSSID set to which the reported AP belongs), a nontransmitted BSSID in the multiple BSSID set to which the reported AP belongs, to obtain a structure of the multiple BSSID set to which the reported AP belongs.

Optionally, the reporting AP, the reported AP, and the virtual AP may not belong to a multiple BSSID set.

Optionally, structures of the multiple BSSID elements of the multiple BSSID sets in which the reporting AP and the reported AP are located may be in a form of Table 1 and Table 2, and certainly may be in another form. For example, some fields are added, some fields are deleted, or a structure sequence of some fields is changed based on the structures shown in Table 1 and Table 2.

In this embodiment of this application, after learning the structure of the multiple BSSID set based on the AP multi-link device, the station may implement many operations based on the structure. For example, a multi-link STA in the station is simultaneously associated with a plurality of APs in the AP multi-link device based on the structure. In this way, the AP multi-link device can simultaneously serve the STA multi-link device, thereby increasing a throughput, improving transmission robustness, and reducing a transmission delay.

It should be noted that, in both the foregoing solution 1 and solution 2, the MLD information is constructed in a sequence of APs in the MLD device. For example, the MLD information includes information about the reporting AP and information about the reported AP in the MLD device. In the solution described below, MLD information is constructed in a sequence of APs in a multiple BSSID set. For example, the MLD information includes information about a reporting AP in the multiple BSSID and information about a member AP in the multiple BSSID. In an optional solution, the MLD information may further include the following content:

information about the reporting AP, where the information about the reporting AP is the same as that in the solution 1.

Optionally, if the reporting AP is located in an MLD, the information about the reporting AP includes information about each AP in the MLD in which the reporting AP is located. For example, as shown in FIG. 6, if the reporting AP is an AP whose MAC address is BSSID-1x, in addition to the reporting AP, APs in the MLD in which the reporting AP is located further include an AP whose identifier is BSSID-2y and an AP whose MAC address is BSSID-3x.

The MLD information may further include the information about the member AP,
where the member AP and the reporting AP belong to the same multiple BSSID set, and the information about the member AP is the same as the information about the reported AP in solution 1.

Optionally, if the member AP is located in an MLD, the information about the member AP includes information about each AP in the MLD in which the member AP is located. For example, as shown in FIG. 6, if an AP whose MAC address is BSSID-1x is the reporting AP, the member AP is an AP whose MAC address is BSSID-1y, and APs in the MLD in which the member AP is located include an AP whose MAC address is BSSID-2z.

The MLD information may further include the information about the virtual AP. The virtual AP is not located in the multiple BSSID set to which the reporting AP belongs and satisfies a constraint condition. There are at least the following two cases for the constraint condition.

Case 1: The reporting AP and the virtual AP do not belong to a same MLD, but belong to a same multiple BSSID as a member AP in the MLD to which the reporting AP belongs. For example, as shown in FIG. 6, it is assumed that the reporting AP is BSSID-1x, and four APs whose MAC addresses are BSSID-2x, BSSID-3y, BSSID-2z and BSSID-3z are not located in the multiple BSSID set to which the reporting AP belongs, and do not belong to the same MLD as the reporting AP. Therefore, relative to the reporting AP whose MAC address is BSSID-1x, the three APs whose MAC addresses are BSSID-2x, BSSID-3y, and BSSID-3z are all virtual APs.

Case 2: The virtual AP does not belong to a same MLD as each member of the multiple BSSID set to which the reporting AP belongs, but are in a same multiple BSSID as one member AP in the MLD to which the reporting AP belongs. For example, as shown in FIG. 6, it is assumed that the reporting AP is BSSID-1x, and two APs whose MAC addresses are BSSID-2x and BSSID-3y are not located in the multiple BSSID set to which the reporting AP belongs, and do not belong to the same MLD as each member of the multiple BSSID set to which the reporting AP belongs. Therefore, relative to the reporting AP whose MAC address is BSSID-1x, the two APs whose MAC addresses are BSSID-2x and BSSID-3y are both virtual APs.

In this case, the information about the virtual AP is the same as the information about the virtual AP in solution 1.

Generally, the MAC address of the AP is also a BSSID for establishing a BSS by the AP. This principle is followed in all embodiments of this application. Optionally, if the MAC address of the AP is different from the BSSID for establishing the BSS by the AP, information about an AP (for example, the reporting AP, the reported AP, and the virtual AP) may further carry a BSSID field of the BSS established by the AP.

It should be noted that the quantity of MLDs, the quantity of multiple BSSID sets, and the entire structure shown in FIG. 6 and FIG. 7 are merely examples. For another structure, MLD information may be constructed and reported by using the method shown in embodiments of this application.

In the method shown in FIG. 4, the access point indicates, to the station via the MLD information, a structure of a multiple BSSID set based on an AP multi-link device, so that concurrent communication (for example, establishing an association) between a plurality of APs in the AP multi-link device and a plurality of STAs in the STA multi-link device can be supported, to increase a throughput of a wireless network, improve transmission robustness, and reduce a transmission delay.

Figure 8:
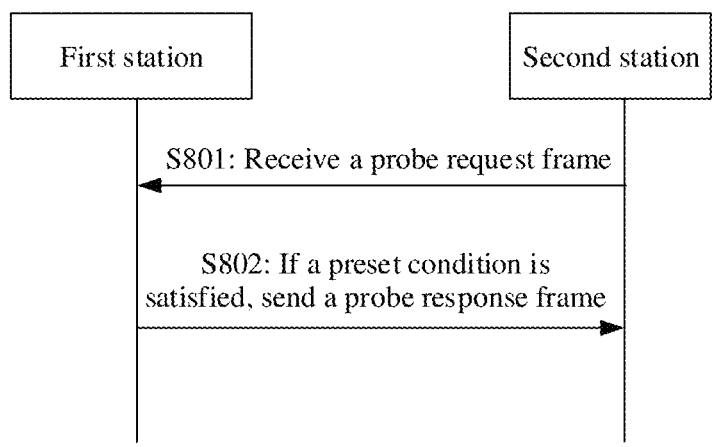
FIG. 8 is a schematic interaction diagram of a communication method applied to a multi-link device in a WLAN according to an embodiment of this application.

FIG. 8 shows an information indication method based on a multi-link device and a multiple BSSID according to an embodiment of this application. The method may be applied between stations, between an access point and a station, and between access points. The method includes but is not limited to the following steps.

Step S801: A first station receives a probe request frame sent by a second station.

Specifically, after receiving the probe request frame, the first station replies with an Ack frame.

The first station is a station in a multi-link device (MLD). For example, the MLD is an AP multi-link device. For another example, the MLD is specifically a STA multi-link device. Optionally, "the first station receives the probe request frame sent by the second station" may also be expressed as "the multi-link device receives the probe request frame sent by the second station".

The second station is a station in a multi-link device (MLD) or a single-link station. For example, the MLD is specifically an AP multi-link device. For another example, the MLD is specifically a STA multi-link device.

In an example, the first station is an AP in the AP multi-link device, and the second station is a station or a station in the STA multi-link device. The following uses an example in which the first station is an AP in the AP multi-link device for description.

The multi-link device MLD that the first station is located in includes n logical APs operating on n different links. Therefore, the APs may be represented by using link identifiers link 1, link 2, . . . , and link n, and MAC addresses of the APs are different. One multi-link device is identified by using a MAC address of one MLD. In other words, the MAC address is used to identify the multi-link device management entity. The MAC address of the multi-link device may be the same as one MAC address of n logical APs included in an address of the multi-link AP, or may be different from all MAC addresses of the n logical APs. In addition, one or more logical APs in the multi-link device may belong to different multiple base service set identifier (BSSID) sets. Generally, logical APs in one multi-link device belong to different multiple BSSID sets. However, it is also possible that two logical APs in the multi-link device operate on one link. In this case, the two logical APs may belong to a same multiple BSSID set.

For example, as shown in FIG. 5, a MAC address of a multi-link device is, for example, MLD1, and the multi-link device includes three logical APs: an AP1, an AP2, and an AP3. The AP1, the AP2, and the AP3 operate on a link 1 a link 2, and a link 3, respectively. MAC addresses of the AP1, the AP2, and the AP3 are BSSID_11, BSSID_21, and BSSID_31, respectively (before 802.11ax, a BSSID of a BSS established by an AP is an AP MAC address, and may change subsequently). The AP1 is a member of a multiple BSSID set 1, and the multiple BSSID set 1 further includes an AP4 whose MAC address is BSSID_13. The AP2 is a member of a multiple BSSID set 2, and the multiple BSSID set 2 further includes an AP5 whose MAC address is BSSID_22 and an AP6 whose MAC address is BSSID_23. The AP3 is a member of a multiple BSSID set 3, and the multiple BSSID set 3 further includes an AP7 whose MAC address is BSSID_32 and the AP8 whose MAC address is BSSID_33.

FIG. 6 shows an architecture in which APs in BSSs identified by transmitted BSSIDs in a plurality of multiple BSSID sets are not from a same AP multi-link device. For ease of description, an AP that is in a BSS and that is identified by a transmitted BSSID may be referred to as a transmitted AP (transmitted BSSID AP). An AP that is in a BSS and that is identified by a nontransmitted BSSID is referred to as a nontransmitted AP (nontransmitted BSSID AP). An AP whose MAC address identifier ends with x is a transmitted BSSID AP, and an AP whose MAC address identifier ends with y or z is an AP corresponding to a nontransmitted BSSID. For example, a transmitted BSSID AP in a multiple BSSID set 1 is the AP1 whose MAC address identifier is BSSID_1x, and an AP corresponding to a nontransmitted BSSID in the multiple BSSID set 1 is an AP4 whose MAC address identifier is BSSID_1y. A transmitted BSSID AP in a multiple BSSID set 2 is an AP5 whose MAC address identifier is BSSID_2x, and APs corresponding to nontransmitted BSSIDs in the multiple BSSID set 2 include an AP2 whose address identifier is BSSID_2y and an AP6 whose MAC address identifier is BSSID_2z. A transmitted BSSID AP in a multiple BSSID set 3 is an AP3 whose MAC address identifier is BSSID_3x, and APs corresponding to nontransmitted BSSIDs in the multiple BSSID set 3 include an AP7 whose MAC address identifier is BSSID_3y and an AP8 whose MAC address identifier is BSSID_3z. It can be learned from FIG. 6 that transmitted BSSID APs (namely, transmitted APs) from different multiple BSSID sets are distributed in different AP multi-link devices. For example, an AP whose MAC address is BSSID-1x and an AP whose MAC address is BSSID-2x are respectively located in an AP multi-link device MLD 1 and an AP multi-link device MLD 2.

FIG. 7 shows that APs in BSSs identified by transmitted BSSIDs in a plurality of multiple BSSID sets are from a same AP multi-link device. For ease of description, an AP that is in a BSS and that is identified by a transmitted BSSID may be referred to as a transmitted AP (transmitted BSSID AP). An AP that is in a BSS and that is identified by a nontransmitted BSSID is referred to as a nontransmitted AP (nontransmitted BSSID AP). An AP whose MAC address identifier ends with x is a transmitted BSSID AP, and an AP whose MAC address identifier ends with y or z is an AP corresponding to a nontransmitted BSSID. For example, a transmitted BSSID AP in a multiple BSSID set 1 is an AP1 whose MAC address identifier is BSSID_1x, and an AP corresponding to a nontransmitted BSSID in the multiple BSSID set 1 is an AP4 whose MAC address identifier is BSSID_1y. A transmitted BSSID AP in a multiple BSSID set 2 is an AP2 whose MAC address identifier is BSSID_2x, and APs corresponding to nontransmitted BSSIDs in the multiple BSSID set 2 include an AP5 whose MAC address identifier is BSSID_2y and an AP 6 whose MAC address identifier is BSSID_2z. A transmitted BSSID AP in a multiple BSSID set 3 is an AP3 whose MAC address identifier is BSSID_3x, and APs corresponding to nontransmitted BSSIDs in the multiple BSSID set 3 include an AP7 whose MAC address identifier is BSSID_3y and an AP8 whose MAC address identifier is BSSID_3z. It can be learned from FIG. 7 that transmitted BSSID APs (namely, transmitted APs) from different multiple BSSID sets are all in an AP multi-link device MLD 1.

Generally, when the second station needs to be associated with a station, the second station actively scans and discovers neighboring stations (for example, APs), and then associates with an appropriate station among the neighboring stations. When actively scanning neighboring stations, the second station sends a probe request frame on a channel. If a neighboring station receives the probe request frame, the neighboring station replies with an acknowledgment (Ack) frame. Therefore, when receiving the probe request frame, the first station in this embodiment of this application also replies with an Ack frame.

A MAC header of an 802.11 management frame includes a frame control field, a receiver address (address 1), a transmitter address (address 2), and a BSSID field (address 3). The probe request frame belongs to an 802.11 management frame. Therefore, the probe request frame includes a frame control field, a receiver address (address 1), a transmitter address (address 2), and a BSSID field (address 3). In addition, the probe request frame further includes a service set identifier (SSID) field. Optionally, the SSID field includes one or more of an SSID list element and a short SSID list element.

In this embodiment of this application, whether to reply with a probe response frame is determined by using the following step S802 or step S803.

Step S802: If a preset condition is satisfied, the first station sends a probe response frame to the second station.

The multi-link device to which the first station belongs may determine whether the preset condition is satisfied, or a station in the multi-link device may determine whether the preset condition is satisfied. The station may be a station that receives the probe request frame.

The preset condition includes satisfying both a first condition and a second condition.

The first condition is that none of the following conditions a to k is true. The first condition is recorded in standards such as 802.11-2016, 802.11Revmd_D3.0, 802.11ax_D6.0, and is subsequently modified (for example, added) due to a new technology or a new application scenario. This is not limited in this application.

a) The station does not match any of the following:
 1) The station is an access point.
 2) The station is an independent basic service set (IBSS) station.
 3) The station is a mesh network station.
 4) The station is a directional multi-gigabit (DMG) station that does not belong to a personal basic service set (PBSS) and is performing active scanning
 5) The station is a PCP.
b) The address 1 field included in the foregoing probe request frame carries a unicast address, and one of the following conditions is satisfied:
 1) The station does not belong to a multiple BSSID set, and the unicast address is not a media access control (MAC) address of the station.
 2) The station belongs to a multiple BSSID set, and the unicast address does not match any BSS in the multiple BSSID set.
c) The station is a non-AP station, and the address 1 in the probe request frame carries a broadcast address.
d) The station is a non-PCP station in one PBSS, and the address 1 in the probe request frame carries a broadcast address.
e) The station is an IBSS and has not performed transmission on a normal beacon frame or a DMG beacon frame since the last target beacon frame transmission time (TBTT).
f) The station is a mesh network station and the following conditions are satisfied:
 1) The probe request frame includes a mesh network ID element, but the element
 2) The prode request frame includes a mesh network ID element, but the element neither carries a wildcard mesh network ID, nor matches a mesh network ID included in a mesh basic service set (MBSS) connected to the station.
g) The station is not a mesh network station and none of the following conditions are satisfied:
 1) An SSID in the probe request is a wildcard SSID.
 2) An SSID in the probe request frame is the same as an SSID of a BSS in which the station is located.
  2a) The station is an AP that is in a same co-located AP set (in a same device) as a 6 GHz AP, an SSID in the probe request frame matches an SSID of the 6 GHz AP, and the STA reports the co-located 6 GHz AP by using a beacon frame and a probe response frame. (see 26.17.2.4 (Out of band discovery of a 6 GHz BSS)).
 3) The station is a member of a multiple BSSID set, and an SSID in the probe request frame is the same as an SSID of a member of the multiple BSSID set.
 4) The probe request frame includes an SSID list, and the list includes an SSID of a BSS in which the station is located.
 5) dot11SSIDListImplemented is true, the station is an AP that is in a same co-located AP set (in a same device) as a 6 GHz AP, an SSID included in an SSID list in the probe request frame matches an SSID of the 6 GHz AP, and the STA reports the co-located 6 GHz AP by using a beacon frame and a probe response frame (see 26.17.2.4 (Out of band discovery of a 6 GHz BSS)).
 6) dot11ShortSSIDListImplemented is true, the probe request frame includes a short SSID list element, and the short SSID can be mapped to a BSSID of a BSS in which the STA is located. (in other words, dot11ShortSSIDListImplemented is true, the Short SSID List element is present in the Probe Request frame and includes the Short SSID field corresponding to the SSID of the STA's BSS).
 7) dot11ShortSSIDListImplemented is true, the station is an AP that is in a same co-located AP set (in a same device) as a 6 GHz AP, a short SSID included in a short SSID list in the probe request frame may be mapped to an SSID of the 6 GHz AP, and the STA reports the co-located 6 GHz AP by using a beacon frame and a probe response frame. (see 26.17.2.4 (Out of band discovery of a 6 GHz BSS)).
h) The station is not a mesh network station, the address 3 in the probe request frame does not include a wildcard BSSID, and one of the following conditions is satisfied:
 1) The station is not a member of a multiple BSSID set, and the address 3 in the probe request frame does not match a BSSID of a BSS in which the station is located.

2) The station is a member of a multiple BSSID set, and the address 3 in the probe request frame does not match an ID of any BSS in the multiple BSSID set.
i) An identifier dot11InterworkingServiceActivated of the station is true, the probe request frame includes an interworking element and an extension capability element whose interworking field includes 1, and at least one of the following conditions is satisfied:
1) A homogeneous extended service set identifier (HESSID) field in the interworking element is missing, or an HESSID field exists but contains a wildcard HESSID or matches an HESSID field in an InterworkingInfo parameter in a previous MLME-START or MLME-JOIN request source.
2) An access network type field in the interworking element includes a wildcard access network type or matches an access network type of the station.
j) The probe request frame includes a DSSS parameter set element, and a current channel field in the element includes a value different from dot11CurrentChannel.
k) The station is a DMG station, and a transmit antenna of the station is not trained to transmit to a source of the probe request frame.

"The station" refers to the first station that receives the probe request frame, or a station identified by the receiver address (address 1) in the probe request frame.

If one station receives the probe request frame, but the station does not belong to a multiple BSSID set, the station sends a probe response frame according to the foregoing first condition. If one station that receives the probe request frame belongs to a multiple BSSID set, a station corresponding to a transmitted BSSID sends a probe response frame according to the foregoing first condition. A nontransmitted station in the multiple BSSID set is not allowed to send a probe response frame.

In this embodiment of this application, the second condition includes at least an optional case 1 and an optional case 2.

Optional case 1: A reference identifier in the probe request frame matches a reference identifier of any station in the MLD.

Optional case 2: A reference identifier in the probe request frame matches a reference identifier of any station in the MLD, or the receiver address (address 1) in the received probe request frame matches a MAC address of any station in the MLD.

Optionally, the reference identifier herein may be information for identification, such as a MAC address, a BSSID, or an SSID.

For ease of understanding, the following uses a solution 1, a solution 2, and a solution 3 as examples to describe the second condition.

Solution 1: The optional case 1 and the optional case 2 of the second condition are as follows.

Optional case 1: The first station is a member of a multi-link device MLD, and the receiver address (address 1) in the received probe request frame matches a MAC address of any station in the MLD, or the receiver address (address 1) in the probe request frame matches a MAC address of any station in a multiple BSSID set to which any station in the MLD belongs. Optionally, the first station has reported, to the second station by using a management frame, for example, a beacon frame and/or a probe response frame, a station that is in the MLD and that can match the receiver address in the probe request frame.

Optional case 2: The first station is a member of a multi-link device MLD, and the receiver address (address 1) in the received probe request frame matches a MAC address of any station in the MLD. Optionally, the first station has reported, to the second station by using a management frame, for example, a beacon frame and/or a probe response frame, a station that is in the MLD and that can match the receiver address in the probe request frame.

Figure 9:
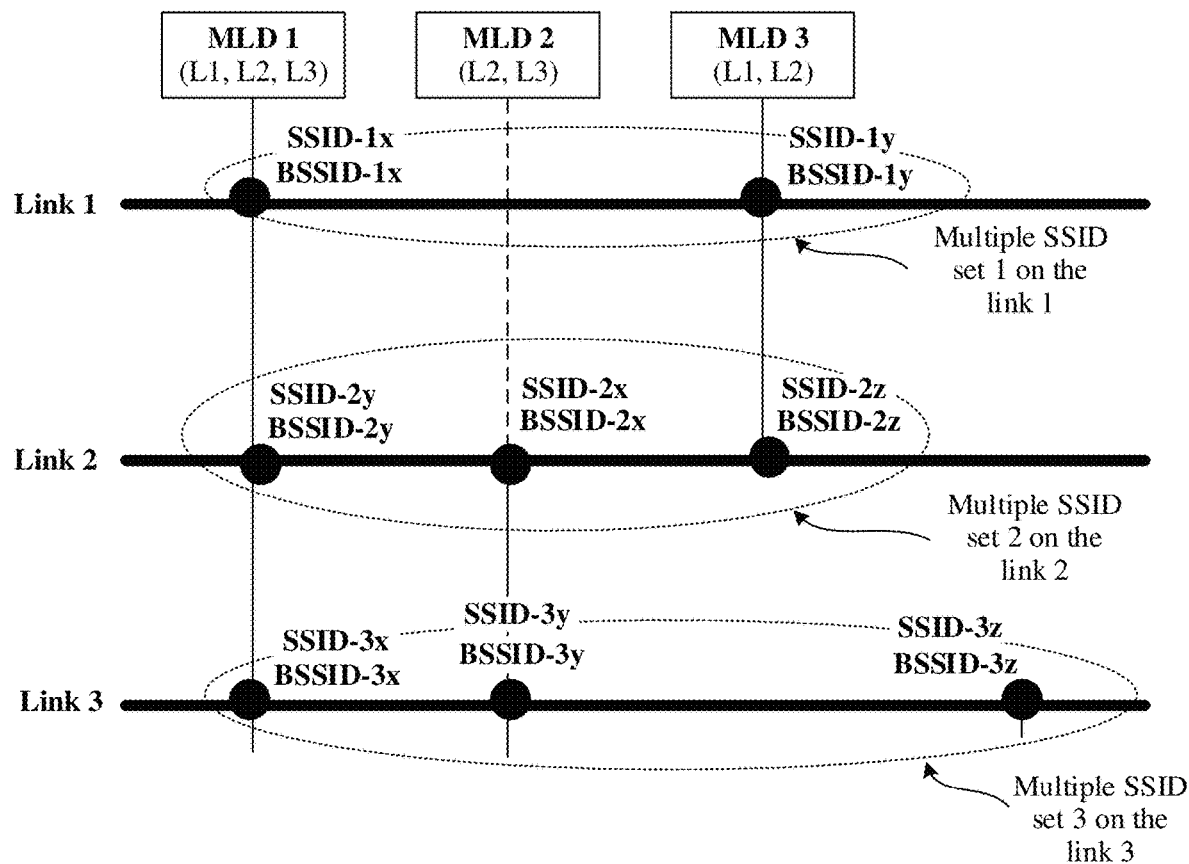
FIG. 9 is a schematic diagram of another multiple BSSID set framework based on MLD according to an embodiment of this application.

For example, as shown in FIG. 9, an AP whose MAC address is BSSID_1x receives a probe request frame, and a receiver address in the probe request frame is BSSID_2y. An AP whose MAC address is BSSID_2y and the AP whose MAC address is BSSID_1x are in a same MLD. Therefore, the foregoing second condition is satisfied. In this case, the AP whose address is BSSID_1x replies with a probe response frame.

For another example, an AP whose MAC address is BSSID_1x receives a probe request frame, and a receiver address in the probe request frame is BSSID_2z. An AP whose MAC address is BSSID_2z and an AP whose MAC address is BSSID_2y are from a same multiple BSSID, and the AP whose MAC address is BSSID_2y and the AP whose MAC address is BSSID_1x are in a same MLD. Therefore, the foregoing second condition is satisfied. In this case, the AP whose address is BSSID_1x replies with a probe response frame.

For another example, an AP whose MAC address is BSSID_1y receives a probe request frame, where a receiver address in the probe request frame is BSSID_2z. An AP whose MAC address is BSSID_2z and an AP whose MAC address is BSSID_2y are from a same multiple BSSID, and the AP whose MAC address is BSSID_2y and an AP whose MAC address is BSSID_1x are in a same MLD. Therefore, the foregoing second condition is satisfied. Because the AP whose address is BSSID_1x and the receiver address BSSID_1y in the probe request frame are from a same multiple BSSID set, and the AP whose address is BSSID_1x is a transmitted BSSID AP, the AP whose MAC address is BSSID_1x replies with a probe response frame.

Solution 2: The optional case 1 and the optional case 2 of the second condition are as follows.

Optional case 1: The first station is a member of a multi-link device MLD, and an SSID field in the received probe request frame, an SSID included in an SSID list element, or an SSID to which a short SSID included in a short SSID list element is mapped matches an SSID of any station in the MLD, or the SSID field in the probe request frame, the SSID included in the SSID list element, or the SSID to which the short SSID included in the short SSID list element is mapped matches an SSID of any station in a multiple BSSID set to which any station in the MLD belongs. Optionally, the first station has reported, to the second station by using a management frame, for example, a beacon frame and/or a probe response frame, the station that is in the MLD and that matches the SSID field in the probe request frame, the SSID included in the SSID list element, or the SSID to which the short SSID included in the short SSID list element is mapped.

Optional case 2: The first station is a member of a multi-link device MLD, and an SSID field in the received probe request frame, an SSID included in an SSID list element, or an SSID to which a short SSID included in a short SSID list element is mapped matches an SSID of any station in the MLD. Optionally, the first station has reported, to the second station by using a management frame, for example, a beacon frame and/or a probe response frame, the station that is in the MLD and that matches the SSID field in the probe request frame, the SSID included in the SSID list element, or the SSID to which the short SSID included in the short SSID list element is mapped. For example, as shown in FIG. 9, an AP whose BSSID is BSSID_1x receives a probe request frame, an SSID in the probe request frame is SSID_2y, a BSSID corresponding to an AP whose SSID is SSID_2y is BSSID_2y, and an AP whose BSSID is BSSID_2y and the AP whose BSSID is BSSID_1x are from a same MLD. Therefore, the foregoing second condition is satisfied. In this case, the AP whose MAC address BSSID_1x replies with a probe response frame.

For another example, an AP whose BSSID is BSSID_1x receives a probe request frame, where an SSID in the probe request frame is SSID_2z. A BSSID corresponding to an AP whose SSID is SSID_2z is BSSID_2z, an AP whose BSSID is BSSID_2z and an AP whose BSSID is BSSID_2y are from a same multiple BSSID, and the AP whose BSSID is BSSID_2y and the AP whose BSSID is BSSID_1x are from a same MLD. Therefore, the foregoing second condition is satisfied. In this case, the AP whose MAC address BSSID_1x replies with a probe response frame.

Solution 3: The optional case 1 and the optional case 2 of the second condition are as follows.

Optional case 1: The first station is a member of a multi-link device MLD, and the BSSID field (address 3) in the received probe request frame matches a BSSID of any station in the MLD, or the BSSID field (address 3) in the probe request frame matches a BSSID of any station in a multiple BSSID set to which any station in the MLD belongs. Optionally, the first station has reported, to the second station by using a management frame, for example, by using a beacon frame and/or a probe response frame, a station that is in the MLD and that can match the BSSID field in the probe request frame.

Optional case 2: The first station is a member of a multi-link device MLD, and the BSSID field (address 3) in the received probe request frame matches a BSSID of any station in the MLD. Optionally, the first station has reported, to the second station by using a management frame, for example, by using a beacon frame and/or a probe response frame, a station that is in the MLD and that can match the BSSID field in the probe request frame. For example, as shown in FIG. 9, an AP whose BSSID is BSSID_1x receives a probe request frame, and a receiver address in the probe request frame is BSSID_2y. An AP whose receiver address is BSSID_2y and the AP whose BSSID is BSSID_1x are in a same MLD. Therefore, the foregoing second condition is satisfied. In this case, the AP whose MAC address BSSID_1x replies with a probe response frame.

For another example, an AP whose BSSID is BSSID_1x receives a probe request frame, where a receiver address in the probe request frame is BSSID_2z. An AP whose BSSID is BSSID_2z and an AP whose BSSID is BSSID_2y are from a same multiple BSSID, and the AP whose BSSID is BSSID_2y and the AP whose BSSID is BSSID_1x are from a same MLD. Therefore, the foregoing second condition is satisfied. In this case, the AP whose MAC address BSSID_1x replies with a probe response frame.

Description of step S802 from another perspective: If any one of third conditions is satisfied, the first station does not send a probe response frame to the second station.

In this embodiment of this application, a condition obtained by combining the first condition and the second condition in the optional solution 1 may be referred to as a first preset condition, a condition obtained by combining the first condition and the second condition in the optional solution 2 may be referred to as a second preset condition, and a condition obtained by combining the first condition and the second condition in the optional solution 3 may be referred to as a third preset condition. The following provides three optional third conditions. The first third condition is equivalent to a reverse description of the first preset condition, the second third condition is equivalent to a reverse description of the second preset condition, and the third condition is equivalent to a reverse description of the third preset condition.

It may be understood that, after determining according to the third condition is performed, a probe response frame needs to be sent to the second station in all cases except cases in which a probe response frame is not sent to the second station.

The first third condition includes at least one of the following conditions a to g (the condition b is modified relative to the condition b in the first condition):
  a) The station does not match any of the following:
    1) The station is an access point.
    2) The station is an IBSS station.
    3) The station is a mesh network station.
    4) The station is a DMG station that does not belong to a PBSS and is performing active scanning
    5) The station is a PCP.
  b) The condition b may be specifically the following condition b1, or the following condition b2.
    b1) The address 1 field included in the foregoing probe request frame carries a unicast address, and one of the following conditions is satisfied:
      1) The station does not belong to an MLD or a multiple BSSID set, and the unicast address is not a MAC address of the station.
      2) The station belongs to a multiple BSSID set, none of members of the multiple BSSID set belong to an MLD, and the unicast address does not match any BSS in the multiple BSSID set.
      3) The station belongs to an MLD, none of members of the MLD belong to a multiple BSSID set, and the unicast address does not match a MAC address of any station in the MLD. Optionally, the first station has reported, to the second station by using a management frame, for example, a beacon frame and/or a probe response frame, a station that is in the MLD and that can match the receiver address in the probe request frame.
      4) The station belongs to an MLD, a member of the MLD belongs to a multiple BSSID set, and the unicast address does not match a MAC address of any station in the MLD, or does not match any BSS in a multiple BSSID set to which any member of the MLD belongs. Optionally, the first station has reported, to the second station by using a management frame, for example, a beacon frame and/or a probe response frame, a station that is in the MLD and that can match the receiver address in the probe request frame.
    b2) The address 1 field included in the foregoing probe request frame carries a unicast address, and one of the following conditions is satisfied:
      1) The station does not belong to an MLD or a multiple BSSID set, and the unicast address is not a MAC address of the station.
      2) The station belongs to a multiple BSSID set, none of members of the multiple BSSID set belong to an MLD, and the unicast address does not match any BSS in the multiple BSSID set.
      3) The station belongs to an MLD, and the unicast address does not match a MAC address of any station in the MLD. Optionally, the first station has reported, to the second station by using a management frame, for example, a beacon frame and/or a probe response frame, a station that is in the MLD and that can match the receiver address in the probe request frame.
c) The station is a non-AP station, and the address 1 in the probe request frame carries a broadcast address.
d) The station is a non-PCP station in one PBSS, and the address 1 in the probe request frame carries a broadcast address.
e) The station is an IBSS and has not performed transmission on a normal beacon frame or a DMG beacon frame since the last TBTT.
f) The station is a mesh network station and the following conditions are satisfied:
  1) The probe request frame does not include a mesh network ID element.
  2) The probe request frame includes a mesh network ID element, but the element neither carries a wildcard mesh network ID, nor matches a mesh network ID included in an MBSS connected to the station.
g) The station is not a mesh network station and none of the following conditions are satisfied:
  1) An SSID in the probe request is a wildcard SSID.
  2) An SSID in the probe request frame is the same as an SSID of a BSS in which the station is located.
    2a) The station is an AP that is in a same co-located AP set (in a same device) as a 6 GHz AP, an SSID in the probe request frame matches an SSID of the 6 GHz AP, and the STA reports the co-located 6 GHz AP by using a beacon frame and a probe response frame. (see 26.17.2.4 (Out of band discovery of a 6 GHz BSS)).
  3) The station is a member of a multiple BSSID set, and an SSID in the probe request frame is the same as an SSID of a member of the multiple BSSID set.
  4) The probe request frame includes an SSID list, and the list includes an SSID of a BSS in which the station is located.
  5) dot11SSIDListImplemented is true, the station is an AP that is in a same co-located AP set (in a same device) as a 6 GHz AP, an SSID included in an SSID list in the probe request frame matches an SSID of the 6 GHz AP, and the STA reports the co-located 6 GHz AP by using a beacon frame and a probe response frame (see 26.17.2.4 (Out of band discovery of a 6 GHz BSS)).
  6) dot11ShortSSIDListImplemented is true, the probe request frame includes a short SSID, and the short SSID can be mapped to a BSSID of a BSS in which the STA is located. (in other words, dot11ShortSSIDListImplemented is true, the Short SSID List element is present in the Probe Request frame and includes the Short SSID field corresponding to the SSID of the STA's BSS).
  7) dot11ShortSSIDListImplemented is true, the station is an AP that is in a same co-located AP set (in a same device) as a 6 GHz AP, a short SSID included in a short SSID list in the probe request frame may be mapped to an SSID of the 6 GHz AP, and the STA reports the co-located 6 GHz AP by using a beacon frame and a probe response frame. (see 26.17.2.4 (Out of band discovery of a 6 GHz BSS)).
h) The station is not a mesh network station, the address 3 in the probe request frame does not include a wildcard BSSID, and one of the following conditions is satisfied:
  1) The station is not a member of a multiple BSSID set, and the address 3 in the probe request frame does not match a BSSID of a BSS in which the station is located.
  2) The station is a member of a multiple BSSID set, and the address 3 in the probe request frame does not match an ID of any BSS in the multiple BSSID set.
i) An identifier dot11InterworkingServiceActivated of the station is true, the probe request frame includes an interworking element and an extension capability element whose Interworking field includes 1, and at least one of the following conditions is satisfied:
  1) An HESSID field in the interworking element is missing, or an HESSID field exists but contains a wildcard HESSID or matches an HESSID field in an InterworkingInfo parameter in a previous MLME-START or MLME-JOIN request source.
  2) An access network type field in the interworking element includes a wildcard access network type or matches an access network type of the station.
j) The probe request frame includes a DSSS parameter set element, and a current channel field in the element includes a value different from dot11CurrentChannel
k) The station is a DMG station, and a transmit antenna of the station is not trained to transmit to a source of the probe request frame.

It should be noted that the detailed conditions included in the third condition may be further deleted, added, or modified based on a requirement of a specific scenario. This is not limited in this application.

"The station" refers to the first station that receives the probe request frame, or a station identified by the receiver address (address 1) in the probe request frame.

The second third condition includes at least one of the following conditions a to g (the condition g is modified relative to the condition g in the first condition):
  a) The station does not match any of the following:
    1) The station is an access point.
    2) The station is an IBSS station.
    3) The station is a mesh network station.
    4) The station is a DMG station that does not belong to a PBSS and is performing active scanning
    5) The station is a PCP.
  b) The address 1 field included in the foregoing probe request frame carries a unicast address, and one of the following conditions is satisfied:
    1) The station does not belong to a multiple BSSID set, and the unicast address is not a MAC address of the station.
    2) The station belongs to a multiple BSSID set, and the unicast address does not match any BSS in the multiple BSSID set.
  c) The station is a non-AP station, and the address 1 in the probe request frame carries a broadcast address.
  d) The station is a non-PCP station in one PBSS, and the address 1 in the probe request frame carries a broadcast address.
  e) The station is an IBSS and has not performed transmission on a normal beacon frame or a DMG beacon frame since the last TBTT.
  f) The station is a mesh network station and the following conditions are satisfied:
    1) The probe request frame does not include a mesh network ID element.
    2) The probe request frame includes a mesh network ID element, but the element neither carries a wildcard mesh network ID, nor matches a mesh network ID included in an MBSS connected to the station.

g) The condition g is specifically the following condition g1, or the following condition g2.

g1) The station is not a mesh network station and none of the following conditions are satisfied:
1) An SSID in the probe request is a wildcard SSID.
2) The station does not belong to an MLD, and an SSID in the probe request frame is the same as an SSID of a BSS in which the station is located.
   2a) The station is an AP that is in a same co-located AP set (in a same device) as a 6 GHz AP, an SSID in the probe request frame matches an SSID of the 6 GHz AP, and the STA reports the co-located 6 GHz AP by using a beacon frame and a probe response frame. (see 26.17.2.4 (Out of band discovery of a 6 GHz BSS)).
3) The station is a member of a multiple BSSID set, none of members of the multiple BSSID set belong to an MLD, and an SSID in the probe request frame is the same as an SSID of a member of the multiple BSSID set.
   3a) The station is a member of a multiple BSSID set, none of members of the multiple BSSID set belong to an MLD, dot11SSIDListImplemented is true, the probe request frame includes an SSID list, and the SSID list includes an SSID of a member of the multiple BSSID set.
   3b) The station is a member of a multiple BSSID set, none of members of the multiple BSSID set belong to an MLD, dot11SSIDListImplemented is true, the probe request frame includes a short SSID list, and a short SSID included in the short SSID list can be mapped to an SSID of a member of the multiple BSSID set.
4) The station does not belong to an MLD, dot11ShortSSIDListImplemented is true, the probe request frame includes an SSID list, and the list includes an SSID of a BSS in which the station is located.
5) dot11SSIDListImplemented is true, the station is an AP that is in a same co-located AP set (in a same device) as a 6 GHz AP, an SSID included in an SSID list in the probe request frame matches an SSID of the 6 GHz AP, and the STA reports the co-located 6 GHz AP by using a beacon frame and a probe response frame (see 26.17.2.4 (Out of band discovery of a 6 GHz BSS)).
6) The station does not belong to an MLD, dot11ShortSSIDListImplemented is true, the probe request frame includes a short SSID, and the short SSID can be mapped to a BSSID of a BSS in which the STA is located In other words, dot11ShortSSIDListImplemented is true, Short SSID List element is present in the Probe Request frame and includes the Short SSID field corresponding to the SSID of the STA's BSS).
7) dot11ShortSSIDListImplemented is true, the station is an AP that is in a same co-located AP set (in a same device) as a 6 GHz AP, a short SSID included in a short SSID list in the probe request frame may be mapped to an SSID of the 6 GHz AP, and the STA reports the co-located 6 GHz AP by using a beacon frame and a probe response frame. (see 26.17.2.4 (Out of band discovery of a 6 GHz BSS)).
8) The station belongs to an MLD, none of members of the MLD belong to a multiple BSSID set, and an SSID in the probe request frame matches an SSID of a BSS in which any station in the MLD is located. Optionally, the first station has reported, to the second station by using a management frame, for example, a beacon frame and/or a probe response frame, the station that is in the MLD and that matches the SSID field in the probe request frame, the SSID included in the SSID list element, or the SSID to which the short SSID included in the short SSID list element is mapped.
9) The station belongs to an MLD, none of members of the MLD belong to a multiple BSSID set, dot11SSIDListImplemented is true, the probe request frame includes an SSID list, and the list includes an SSID of a BSS in which any station in the MLD is located. Optionally, the first station has reported, to the second station by using a management frame, for example, a beacon frame and/or a probe response frame, the station that is in the MLD and that matches the SSID field in the probe request frame, the SSID included in the SSID list element, or the SSID to which the short SSID included in the short SSID list element is mapped.
10) The station belongs to an MLD, none of members of the MLD belong to a multiple BSSID set, dot11ShortSSIDListImplemented is true, the probe request frame includes a short SSID list, and a short SSID included in the list can be mapped to an SSID of a BSS in which any station in the MLD is located. Optionally, the first station has reported, to the second station by using a management frame, for example, a beacon frame and/or a probe response frame, the station that is in the MLD and that matches the SSID field in the probe request frame, the SSID included in the SSID list element, or the SSID to which the short SSID included in the short SSID list element is mapped.
11) The station belongs to an MLD, one member of the MLD belongs to a multiple BSSID set, and an SSID in the probe request frame matches an SSID of a BSS in which any station in the MLD is located, or matches an SSID of any BSS in a multiple BSSID set to which any member of the MLD belongs. Optionally, the first station has reported, to the second station by using a management frame, for example, a beacon frame and/or a probe response frame, the station that is in the MLD and that matches the SSID field in the probe request frame, the SSID included in the SSID list element, or the SSID to which the short SSID included in the short SSID list element is mapped.
12) The station belongs to an MLD, one member of the MLD belongs to a multiple BSSID set, dot11SSIDListImplemented is true, the probe request frame includes an SSID list, and the list includes an SSID of a BSS in which any station in the MLD is located, or includes an SSID of any BSS in a multiple BSSID set to which any member of the MLD belongs. Optionally, the first station has reported, to the second station by using a management frame, for example, a beacon frame and/or a probe response frame, the station that is in the MLD and that matches the SSID field in the probe request frame, the SSID included in the SSID list element, or the SSID to which the short SSID included in the short SSID list element is mapped.
13) The station belongs to an MLD, one member of the MLD belongs to a multiple BSSID set, dot11ShortSSIDListImplemented is true, the probe request frame includes a short SSID list, and a short SSID included in the list can be mapped to an SSID of a BSS in which any station in the MLD is located, or can be mapped to an SSID of any BSS in a multiple BSSID set to which any member of the MLD belongs. Optionally, the first station has reported, to the second station by using a management frame, for example, a beacon frame and/or a probe response frame, the station that is in the MLD and that matches the SSID field in the probe request frame, the SSID included in the SSID list element, or the SSID to which the short SSID included in the short SSID list element is mapped.

g2) The station is not a mesh network station and none of the following conditions are satisfied:
1) An SSID in the probe request is a wildcard SSID.
2) The station does not belong to an MLD, and an SSID in the probe request frame is the same as an SSID of a BSS in which the station is located.
   2a) The station is an AP that is in a same co-located AP set (in a same device) as a 6 GHz AP, an SSID in the probe request frame matches an SSID of the 6 GHz AP, and the STA reports the co-located 6 GHz AP by using a beacon frame and a probe response frame. (see 26.17.2.4 (Out of band discovery of a 6 GHz BSS)).
3) The station is a member of a multiple BSSID set, none of members of the multiple BSSID set belong to an MLD, and an SSID in the probe request frame is the same as an SSID of a member of the multiple BSSID set.
   3a) The station is a member of a multiple BSSID set, none of members of the multiple BSSID set belong to an MLD, dot11SSIDListImplemented is true, the probe request frame includes an SSID list, and the SSID list includes an SSID of a member of the multiple BSSID set.
   3b) The station is a member of a multiple BSSID set, none of members of the multiple BSSID set belong to an MLD, dot11ShortSSIDListImplemented is true, the probe request frame includes a short SSID list, and a short SSID included in the short SSID list can be mapped to an SSID of a member of the multiple BSSID set.
4) The station does not belong to an MLD, dot11SSIDListImplemented is true, the probe request frame includes an SSID list, and the list includes an SSID of a BSS in which the station is located.
5) dot11SSIDListImplemented is true, the station is an AP that is in a same co-located AP set (in a same device) as a 6 GHz AP, an SSID included in an SSID list in the probe request frame matches an SSID of the 6 GHz AP, and the STA reports the co-located 6 GHz AP by using a beacon frame and a probe response frame (see 26.17.2.4 (Out of band discovery of a 6 GHz BSS)).
6) The station does not belong to an MLD, dot11ShortSSIDListImplemented is true, the probe request frame includes a short SSID, and the short SSID can be mapped to a BSSID of a BSS in which the STA is located (In other words, dot11ShortSSIDListImplemented is true, the Short SSID List element is present in the Probe Request frame and includes the Short SSID field corresponding to the SSID of the STA's BSS).
7) dot11ShortSSIDListImplemented is true, the station is an AP that is in a same co-located AP set (in a same device) as a 6 GHz AP, a short SSID included in a short SSID list in the probe request frame may be mapped to an SSID of the 6 GHz AP, and the STA reports the co-located 6 GHz AP by using a beacon frame and a probe response frame. (see 26.17.2.4 (Out of band discovery of a 6 GHz BSS)).
8) The station belongs to an MLD, and an SSID in the probe request frame matches an SSID of a BSS in which any station in the MLD is located. Optionally, the first station has reported, to the second station by using a management frame, for example, a beacon frame and/or a probe response frame, the station that is in the MLD and that matches the SSID field in the probe request frame, the SSID included in the SSID list element, or the SSID to which the short SSID included in the short SSID list element is mapped.
9) The station belongs to an MLD, the probe request frame includes an SSID list, and the list includes an SSID of a BSS in which any station in the MLD is located. Optionally, the first station has reported, to the second station by using a management frame, for example, a beacon frame and/or a probe response frame, the station that is in the MLD and that matches the SSID field in the probe request frame, the SSID included in the SSID list element, or the SSID to which the short SSID included in the short SSID list element is mapped.
10) The station belongs to an MLD, the probe request frame includes a short SSID list, and a short SSID included in the list can be mapped to an SSID of a BSS in which any station in the MLD is located. Optionally, the first station has reported, to the second station by using a management frame, for example, a beacon frame and/or a probe response frame, the station that is in the MLD and that matches the SSID field in the probe request frame, the SSID included in the SSID list element, or the SSID to which the short SSID included in the short SSID list element is mapped.

h) The station is not a mesh network station, the address 3 in the probe request frame does not include a wildcard BSSID, and one of the following conditions is satisfied:
1) The station is not a member of a multiple BSSID set, and the address 3 in the probe request frame does not match a BSSID of a BSS in which the station is located.
2) The station is a member of a multiple BSSID set, and the address 3 in the probe request frame does not match an ID of any BSS in the multiple BSSID set.

i) An identifier dot11InterworkingServiceActivated of the station is true, the probe request frame includes an interworking element and an extension capability element whose interworking field includes 1, and at least one of the following conditions is satisfied:
1) An HESSID field in the interworking element is missing, or an HESSID field exists but contains a wildcard HESSID or matches an HESSID field in an InterworkingInfo parameter in a previous MLME-START or MLME-JOIN request source.

2) An access network type field in the interworking element includes a wildcard access network type or matches an access network type of the station.

j) The probe request frame includes a DSSS parameter set element, and a current channel field in the element includes a value different from dot11CurrentChannel k) The station is a DMG station, and a transmit antenna of the station is not trained to transmit to a source of the probe request frame.

It should be noted that the detailed conditions included in the third condition may be further deleted, added, or modified based on a requirement of a specific scenario. This is not limited in this application.

"The station" refers to the first station that receives the probe request frame, or a station identified by the receiver address (address 1) in the probe request frame.

The third condition includes at least one of the following conditions a to g (the condition h is modified relative to the condition h in the first condition):

a) The station does not match any of the following:
  1) The station is an access point.
  2) The station is an IBSS station.
  3) The station is a mesh network station.
  4) The station is a DMG station that does not belong to a PBSS and is performing active scanning
  5) The station is a PCP.

b) The address 1 field included in the foregoing probe request frame carries a unicast address, and one of the following conditions is satisfied:
  1) The station does not belong to a multiple BSSID set, and the unicast address is not a MAC address of the station.
  2) The station belongs to a multiple BSSID set, and the unicast address does not match any BSS in the multiple BSSID set.

c) The station is a non-AP station, and the address 1 in the probe request frame carries a broadcast address.

d) The station is a non-PCP station in one PBSS, and the address 1 in the probe request frame carries a broadcast address.

e) The station is an IBSS and has not performed transmission on a normal beacon frame or a DMG beacon frame since the last TBTT.

f) The station is a mesh network station and the following condition are satisfied:
  1) The probe request frame does not include a mesh network ID element.
  2) The probe request frame includes a mesh network ID element, but the element neither carries a wildcard mesh network ID, nor matches a mesh network ID included in an MBSS connected to the station.

g) The station is not a mesh network station and none of the following conditions are satisfied:
  1) An SSID in the probe request is a wildcard SSID.
  2) An SSID in the probe request frame is the same as an SSID of a BSS in which the station is located.
    2a) The station is an AP that is in a same co-located AP set (in a same device) as a 6 GHz AP, an SSID in the probe request frame matches an SSID of the 6 GHz AP, and the STA reports the co-located 6 GHz AP by using a beacon frame and a probe response frame. (see 26.17.2.4 (Out of band discovery of a 6 GHz BSS)).
  3) The station is a member of a multiple BSSID set, and an SSID in the probe request frame is the same as an SSID of a member of the multiple BSSID set.
  4) The probe request frame includes an SSID list, and the list includes an SSID of a BSS in which the station is located.
  5) dot11SSIDListImplemented is true, the station is an AP that is in a same co-located AP set (in a same device) as a 6 GHz AP, an SSID included in an SSID list in the probe request frame matches an SSID of the 6 GHz AP, and the STA reports the co-located 6 GHz AP by using a beacon frame and a probe response frame (see 26.17.2.4 (Out of band discovery of a 6 GHz BSS)).
  6) dot11ShortSSIDListImplemented is true, the probe request frame includes a short SSID, and the short SSID can be mapped to a BSSID of a BSS in which the STA is located. (In other words, dot11ShortSSIDListImplemented is true, the Short SSID List element is present in the Probe Request frame and includes the Short SSID field corresponding to the SSID of the STA's BSS).
  7) dot11ShortSSIDListImplemented is true, the station is an AP that is in a same co-located AP set (in a same device) as a 6 GHz AP, a short SSID included in a short SSID list in the probe request frame may be mapped to an SSID of the 6 GHz AP, and the STA reports the co-located 6 GHz AP by using a beacon frame and a probe response frame. (see 26.17.2.4 (Out of band discovery of a 6 GHz BSS)).

h) The condition h is specifically the following condition h1, or the following condition h2.
  h1) The station is not a mesh network station, the address 3 in the probe request frame does not include a wildcard BSSID, and one of the following conditions is satisfied:
    1) The station does not belong to an MLD, and is not a member of a multiple BSSID set, and the address 3 in the probe request frame does not match a BSSID of a BSS in which the station is located.
    2) The station is a member of a multiple BSSID set, none of members of the multiple BSSID set belong to an MLD, and the address 3 in the probe request frame does not match an ID of any BSS in the multiple BSSID set.
    3) The station belongs to an MLD, none of members of the MLD belong to a multiple BSSID set, and the unicast address does not match a BSSID of a BSS in which any station in the MLD is located. Optionally, the first station has reported in advance, to the second station by using a management frame, for example, by using a beacon frame and/or a probe response frame, a station that is in the MLD and that can match the BSSID field in the probe request frame.
    4) The station belongs to an MLD, a member of the MLD belongs to a multiple BSSID set, and the unicast address does not match a BSSID of a BSS in which any station in the MLD is located, or does not match a BSSID of any BSS in a multiple BSSID set to which any member of the MLD belongs. Optionally, the first station has reported in advance, to the second station by using a management frame, for example, by using a beacon frame and/or a probe response frame, a station that is in the MLD and that can match the BSSID field in the probe request frame.

h2) The station is not a mesh network station, the address 3 in the probe request frame does not include a wildcard BSSID, and one of the following conditions is satisfied:
1) The station does not belong to an MLD, and is not a member of a multiple BSSID set, and the address 3 in the probe request frame does not match a BSSID of a BSS in which the station is located.
2) The station is a member of a multiple BSSID set, none of members of the multiple BSSID set belong to an MLD, and the address 3 in the probe request frame does not match an ID of any BSS in the multiple BSSID set.
3) The station belongs to an MLD, and the unicast address does not match a BSSID of a BSS in which any station in the MLD is located. Optionally, the first station has reported in advance, to the second station by using a management frame, for example, by using a beacon frame and/or a probe response frame, a station that is in the MLD and that can match the BSSID field in the probe request frame.

i) An identifier dot11InterworkingServiceActivated of the station is true, the probe request frame includes an interworking element and an extension capability element whose interworking field includes 1, and at least one of the following conditions is satisfied:
1) An HESSID field in the interworking element is missing, or an HESSID field exists but contains a wildcard HESSID or matches an HESSID field in an InterworkingInfo parameter in a previous MLME-START or MLME-JOIN request source.
2) An access network type field in the interworking element includes a wildcard access network type or matches an access network type of the station.

j) The probe request frame includes a DSSS parameter set element, and a current channel field in the element includes a value different from dot11CurrentChannel k) The station is a DMG station, and a transmit antenna of the station is not trained to transmit to a source of the probe request frame.

It should be noted that the detailed conditions included in the third condition may be further deleted, added, or modified based on a requirement of a specific scenario. This is not limited in this application.

"The station" refers to the first station that receives the probe request frame, or a station identified by the receiver address (address 1) in the probe request frame.

Step S803: The second station receives the probe response frame.

Specifically, when the first station or the multi-link device to which the first station belongs determines, based on the foregoing condition or rule, that a probe response frame can be sent, the first station or the multi-link device to which the first station belongs sends the probe response frame. After receiving the probe response frame, optionally, the second station replies with an Ack frame, to establish an association with the station (that is, a station identified by the receiver address) with which the second station requests association in the probe request frame. Optionally, the second station may also be a single-link device.

In the method shown in FIG. 8, a station in the MLD is allowed to help another station in the same MLD reply with a probe response frame, and may also help any member of a multiple BSSID set to which the another station in the same MLD belongs reply with a probe response frame. In this way, a quantity of probe request frames sent by stations on a channel is reduced, air interface efficiency and station association efficiency are improved.

Optionally, the method embodiment shown in FIG. 4 and the method embodiment shown in FIG. 8 may be performed independently of each other, or may be combined with each other. For example, after an AP (namely, a reporting AP) indicates an architecture of a multiple BSSID set that is based on an MLD to a station by using the method embodiment shown in FIG. 4, the station may select, based on the architecture of the multiple BSSID set based on the MLD, an AP to be associated with, and establish an association relationship. Optionally, the association relationship may be specifically established by using the method embodiment shown in FIG. 8.

The following describes in detail an apparatus provided in embodiments of this application, so that a quantity of probe request frames sent by stations on a channel can be reduced, and station association efficiency can be improved.

Figure 10:
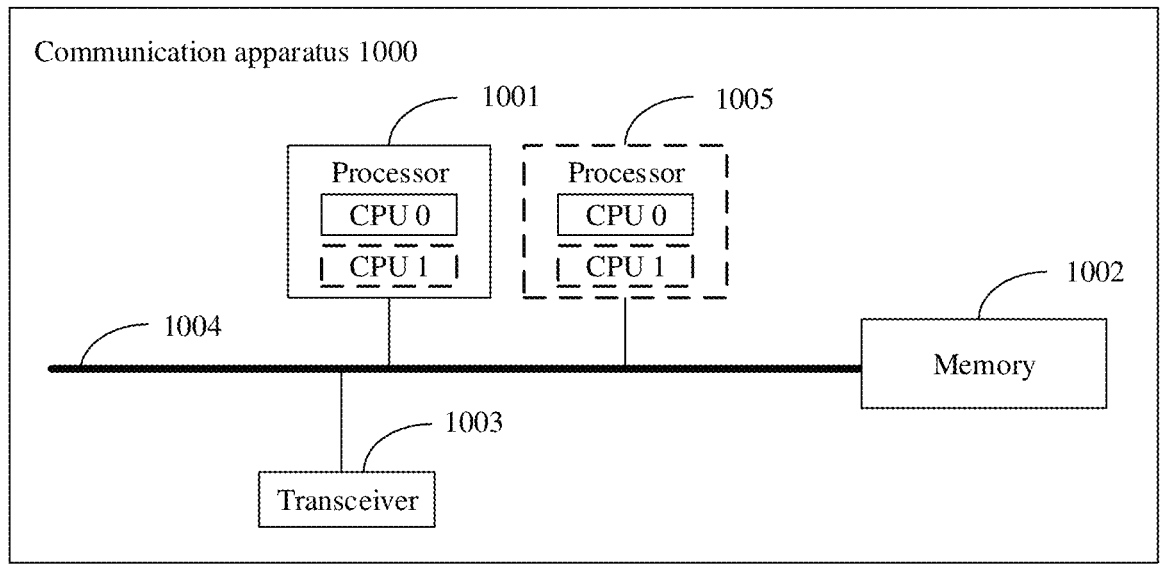
FIG. 10 is a schematic composition diagram of a communication apparatus according to an embodiment of this application.

FIG. 10 shows a communication apparatus 1000 according to an embodiment of this application. The apparatus may be an access point AP (for example, a reporting AP in an AP multi-link device), a first station, or a second station in the foregoing embodiments. Alternatively, the apparatus may be a chip or a processing system in the access point AP (for example, the reporting AP in the AP multi-link device), the first station, or the second station. The apparatus may implement the method and functions in the embodiment shown in FIG. 4, or implement the method and functions in the embodiment shown in FIG. 8. Due to a difference in integration degrees, the communication apparatus may include one or more of components shown in FIG. 10. The components shown in FIG. 10 may include at least one processor 1001, a memory 1002, a transceiver 1003, and a communication bus 1004.

The following specifically describes the components of the communication apparatus 1000 with reference to FIG. 10.

The processor 1001 is a control center of the communication apparatus 1000, and may be one processor or may be a collective term of a plurality of processing elements. For example, the processor 1001 is a central processing unit (CPU), an application-specific integrated circuit (ASIC), or one or more integrated circuits configured to implement this embodiment of this application, for example, one or more microprocessors (DSP), or one or more field programmable gate arrays (FPGA). The processor 1001 may perform various functions of a communication apparatus by running or executing a software program stored in the memory 1002 and invoking data stored in the memory 1002. During a specific implementation, in an embodiment, the processor 1001 may include one or more CPUs, for example, a CPU 0 and a CPU 1 in FIG. 10.

During a specific implementation, in an embodiment, the communication apparatus 1000 may include a plurality of processors, such as the processor 1001 and a processor 1005 in FIG. 10. Each of the processors may be a single-core processor (single-CPU) or may be a multi-core processor (multi-CPU). The processor herein may be one or more communication devices, circuits, and/or processing cores configured to process data (for example, computer program instructions).

The memory 1002 may be a read-only memory (ROM) or another type of static storage communication device that can store static information and instructions, or a random access memory (RAM) or another type of dynamic storage communication device that can store information and instructions, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage communication device, or any other medium that can be used to carry or store expected program code in an instruction form or a data structure form and that can be accessed by a computer. However, the memory 1002 is not limited thereto. The memory 1002 may exist independently, and is connected to the processor 1001 through a communication bus 1004. Alternatively, the memory 1002 may be integrated with the processor 1001. The memory 1002 is configured to store a software program for performing the solutions of this application, and the processor 1001 controls the execution.

The transceiver 1003 is configured to communicate with another device (for example, the station in the embodiment shown in FIG. 4, or the second station in the embodiment shown in FIG. 8). Certainly, the transceiver 1003 may further be configured to communicate with a communication network, for example, the Ethernet, a radio access network (RAN), or a wireless local area network (WLAN). The transceiver 1003 may include a receiving unit for implementing a receiving function, and a sending unit for implementing a sending function.

The communication bus 1004 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is for representing the bus in FIG. 10, but this does not mean that there is only one bus or only one type of bus.

In an example, the communication apparatus 1000 is an entire device. The communication apparatus may include the processor 1001, the memory 1002, the transceiver 1003, and the communication bus 1004. Optionally, the communication apparatus may further include another component, for example, a display frequency.

Optionally, the communication apparatus 1000 is an access point AP (for example, a reporting AP in an AP multi-link device), and may be configured to implement the method and the functions in the embodiment shown in FIG. 4. For example, the memory stores a computer program (instructions). When the processor invokes the computer program, the foregoing methods and the functions are implemented. For example, the processor is configured to generate signaling or a frame (carrying MLD information), and the transceiver is configured to send the signaling or the frame (carrying the MLD information). For example, the processor is configured to control the transceiver to perform step S401. Certainly, a process of generating MLD information in step S401 may also be completed by the processor.

Optionally, the communication apparatus 1000 is a first station, and may be configured to implement the method and the functions of the first station in the embodiment shown in FIG. 8. For example, the memory stores a computer program. When the processor invokes the computer program, the foregoing methods and the functions are implemented. For example, the processor is configured to generate signaling or a frame (for example, a probe response frame), and the transceiver is configured to send the signaling or the frame (for example, receive a probe request frame). For example, the processor is configured to control the transceiver to receive the probe request frame in step S801. Then, the processor determines, based on a related condition, whether to reply with a probe response frame, generates the probe response frame if a response is needed, and sends the probe response frame by using the transceiver.

In another example, the communication apparatus 1000 is a chip system or a processing system in the access point AP (for example, the reporting AP in the AP multi-link device), the first station or the second station, so that a device in which the chip system or the processing system is installed implements the method and the functions in the embodiment shown in FIG. 4 or FIG. 8. In this case, the communication apparatus 1000 may include some components shown in FIG. 10. For example, the communication apparatus 1000 includes the processor. The processor may be coupled to the memory, and invoke and execute the instructions in the memory, to configure a device on which the chip system or the processing system is installed to implement the method and the functions in the embodiment shown in FIG. 4 or FIG. 8. Optionally, the memory may be a component in the chip system or the processing system, or may be a coupled/connected component outside the chip system or the processing system. In an example, the chip system or the processing system is installed in the access point AP (for example, the reporting AP in the AP multi-link device), the first station, or the second station, so that the access point AP (for example, the reporting AP in the AP multi-link device), the first station, or the second station can implement the corresponding method and functions in the foregoing embodiments.

The chip system or the processing system may support communication based on the 802.11 series protocols, for example, 802.11be, 802.11ax, and 802.11ac. The chip system may be installed in devices in various scenarios that support WLAN transmission. The devices in the WLAN transmission scenarios are described at the beginning of this specification, and details are not described herein.

In embodiments of this application, the access point AP (for example, the reporting AP in the AP multi-link device), the first station, or the second station may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example, and is merely logical function division. In an actual implementation, another division manner may be used.

Figure 11:
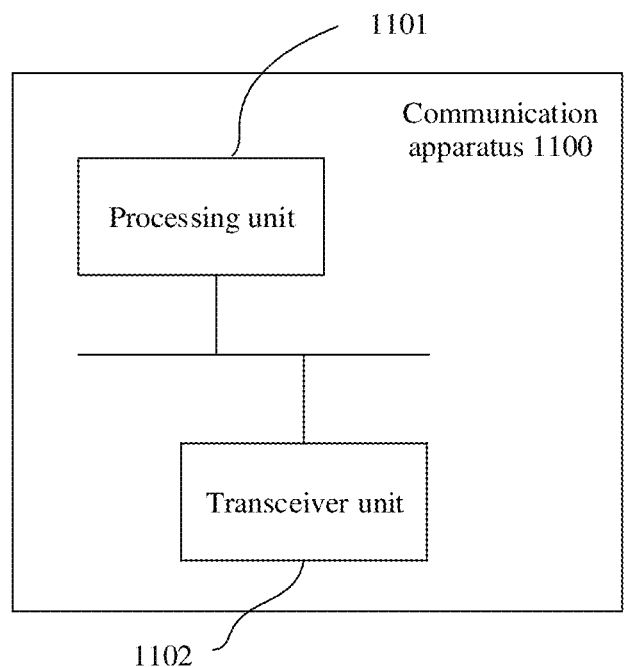
FIG. 11 is a schematic composition diagram of another communication apparatus according to an embodiment of this application.

When an integrated unit is used, FIG. 11 is a possible schematic diagram of a structure of a communication apparatus 1100. The communication apparatus 1100 may be a chip or a processing system in a link device or a multi-link device. The communication apparatus 1100 may perform operations of the multi-link device in the foregoing method embodiments. The communication apparatus 1100 includes a processing unit 1101 and a transceiver unit 1102.

In an example, the communication apparatus 1100 is the foregoing access point AP (for example, the reporting AP in the AP multi-link device), the first station, or the second station.

The processing unit 1101 may be configured to control and manage an action of the communication apparatus 1100, for example, generating MLD information, or determining whether to rely with a probe response frame based on a related condition when a probe request frame is received; and for another example, controlling an operation of the transceiver unit 1102. Optionally, if the communication apparatus 1100 includes a storage unit, the processing unit 1101 may further execute a program or instructions stored in the storage unit, to enable the communication apparatus 1100 to implement the methods and functions in any one of the foregoing embodiments.

For example, the processing unit 1101 may control the transceiver unit to perform step S401 in FIG. 4, or step 801 in FIG. 8, and/or another process of the technology described in this specification. All related content of the steps in the foregoing method embodiments may be cited in functional descriptions of the corresponding functional modules. Details are not described herein again.

For example, the transceiver unit 1102 may receive or send data or signaling transmitted on one link, or may receive or send data or signaling transmitted on a plurality of links. Optionally, the transceiver unit 1102 may be one transceiver module, or may include a plurality of transceiver modules. When the transceiver unit 1102 is one transceiver module, the transceiver module may receive or send data on a plurality of links. For example, when a first multi-link device operates on two links, and the transceiver unit 1102 includes two transceiver modules, one transceiver module operates on one link, and the other transceiver module operates on the other link. For example, the transceiver unit 1102 may be configured to perform, for example, step S401 in FIG. 4, or step S801 in FIG. 8, and/or another process of the technology described in this specification. All related content of the steps in the foregoing method embodiments may be cited in functional descriptions of the corresponding functional modules. Details are not described herein again.

For example, the communication apparatus 1100 may be the communication apparatus shown in FIG. 10, the processing unit 1101 may be the processor 1001 in FIG. 10, and the transceiver unit 1102 may be the transceiver 1003 in FIG. 10. Optionally, the communication apparatus 1100 may further include a memory. The memory is configured to store corresponding program code and data for the communication apparatus 1100 to perform any communication method between multi-link devices provided above. All descriptions of related content of the components in FIG. 10 may be cited in functional descriptions of corresponding components of the communication apparatus 1100. Details are not described herein again.

For example, the communication apparatus 1100 may alternatively be a chip or a processor, the processing unit 1101 is a processing circuit in the chip or the processor, the transceiver unit 1102 may be an input/output circuit in the chip or the processor, and the input/output circuit is an interface for mutual communication or data exchange between the chip or the processor and another coupled component. It can be ensured that signaling or data information or program instructions are input to the chip or the processor for processing, processed data or signaling is output to the another coupled component, and the first multi-link device on which the chip or the processor is installed is controlled to implement a function.

In another example, the communication apparatus 1100 is a chip in the foregoing access point AP (for example, the reporting AP in the AP multi-link device), the first station or the second station.

For example, the processing unit 1101 may be configured to generate MLD information or a probe response frame. For example, the MLD information in step S401 in FIG. 4 is generated by the processing unit 1101, or the probe response frame in S802 in FIG. 8 is generated by the processing unit 1101, and/or another process of the technology described in this specification is performed by the processing unit 1101. All related content of the steps in the foregoing method embodiments may be cited in functional descriptions of the corresponding functional modules. Details are not described herein again.

For example, the transceiver unit 1102 may receive or send data or signaling transmitted on one link, or may receive or send data or signaling transmitted on a plurality of links. Optionally, the transceiver unit 1102 may be one transceiver module, or may include a plurality of transceiver modules. When the transceiver unit 1102 is one transceiver module, the transceiver module may receive or send data on a plurality of links. For example, when the first station operates on two links, and the transceiver unit 1102 includes two transceiver modules, one transceiver module operates on one link, and the other transceiver module operates on the other link. For example, the transceiver unit 1102 may be configured to perform, for example, step S401 in FIG. 4, or steps S801 and S802 in FIG. 8, and/or another process of the technology described in this specification. All related content of the steps in the foregoing method embodiments may be cited in function descriptions of corresponding functional modules. Details are not described herein again.

For example, the communication apparatus 1100 may be the communication apparatus shown in FIG. 10, the processing unit 1101 may be the processor 1001 in FIG. 10, and the transceiver unit 1102 may be the transceiver 1003 in FIG. 10. Optionally, the communication apparatus 1100 may further include a memory. The memory is configured to store program code and data corresponding to any method provided above performed by the communication apparatus 1100. All descriptions of related content of the components in FIG. 10 may be cited in functional descriptions of corresponding components of the communication apparatus 1100. Details are not described herein again.

For example, the communication apparatus 1100 may alternatively be a chip or a processor, the processing unit 1102 is a processing circuit in the chip or the processor, and the transceiver unit 1102 may be an input/output circuit in the chip or the processor. The input/output circuit is an interface for mutual communication or data exchange between the chip or the processor and another coupled component. It is ensured that signaling, data information, or a program instruction is input to the chip or the processor for processing, and processed data or signaling is output to the another coupled component, and a device on which the chip or the processor is installed is controlled to implement a function.

An embodiment of this application further provides a computer-readable storage medium. The computer-readable storage medium stores computer program code. When the processor executes the computer program code, an electronic device (such as an AP, a first station, or a second station) in which the processor is located is enabled to perform the method in any embodiment in FIG. 4 or FIG. 8.

An embodiment of this application further provides a computer program product. When the computer program product runs on a computer, the computer (such as an AP, a first station, or a second station) is enabled to perform the method in any embodiment in FIG. 4 or FIG. 8.

An embodiment of this application further provides a communication apparatus. The apparatus may exist in a product form of a chip. A structure of the apparatus includes a processor and an interface circuit. The processor is configured to communicate with another apparatus through the interface circuit, so that the apparatus performs the method in any embodiment in FIG. 4 or FIG. 8.

An embodiment of this application further provides a communication system. The communication system includes the foregoing access point AP (for example, a reporting AP in an AP multi-link device) and the station. The access point AP (for example, the reporting AP in the AP multi-link device) and the station may perform the method in the embodiment in FIG. 4. Alternatively, the communication system includes the first station and the second station, and the first station and the second station may perform the method in the embodiment in FIG. 8. Method or algorithm steps described in combination with the content disclosed in this application may be implemented by hardware, or may be implemented by a processor by executing software instructions. The software instructions may include a corresponding software module. The software module may be stored in a random access memory (RAM), a flash memory, an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be disposed in an ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer-readable storage medium and a communication medium. The communication medium includes any medium that facilitates transmission of a computer program from one place to another. The storage medium may be any available medium accessible to a general-purpose or a special-purpose computer.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A communication method, comprising:
generating, by a reporting access point (AP) of a multi-link device (MLD), a management frame, wherein the management frame comprises MLD information, wherein the MLD information comprises:
information about the reporting AP,
information about a reported AR, and
shared information, wherein the shared information comprises a medium access control (MAC) address of the MLD, and the reported AP is part of the MLD; and
sending, by the reporting AP, the MLD information.

2. The method according to claim 1, wherein the MLD information further comprises a multiple basic service set identifier (BSSID) element of a multiple BSSID set to which the reporting AP belongs.

3. The method according to claim 1, wherein the MLD information further comprises a multiple BSSID element of a multiple BSSID set to which the reported AP belongs.

4. The method according to claim 1, wherein the information about the reporting AP comprises a multiple BSSID element of a multiple BSSID set to which the reporting AP belongs.

5. The method according to claim 1, wherein the information about the reported AP comprises a multiple BSSID element of a multiple BSSID set to which the reported AP belongs.

6. The method according to claim 1, wherein the multiple BSSID element comprises a nontransmitted BSSID profile, and the nontransmitted BSSID profile comprises a MAC address of an MLD in which a nontransmitted BSSID AP is located.

7. The method according to claim 1, wherein the information about the reported AP comprises a bit indicating whether the reported AP is a transmitted BSSID AP.

8. The method according to claim 1, wherein the information about the reported AP comprises a bit indicating whether the reported AP is a member of a multiple BSSID set.

9. The method according to claim 1, wherein the information about the reported AP comprises two bits which respectively indicate whether the reported AP is a member of a multiple BSSID set and whether the reported AP is a transmitted BSSID AP.

10. The method according to claim 1, wherein the shared information further comprises an indication of a quantity of reported AP.

11. A multi-link device (MLD), comprising a reporting access point (AP) and a reported AP, wherein the reporting AP is configured to:
generate a management frame, wherein the management frame comprises MLD information, wherein the MLD information comprises:
information about the reporting AP,
information about the reported AP, and
shared information, wherein the shared information comprises medium access control (MAC) address of the MLD; and
send the MLD information.

12. The MLD according to claim 11, wherein the MLD information further comprises a multiple basic service set identifier (BSSID) element of a multiple BSSID set to which the reporting AP belongs.

13. The MLD according to claim 11, wherein the MLD information further comprises a multiple BSSID element of a multiple BSSID set to which the reported AP belongs.

14. The MLD according to claim 11, wherein the information about the reporting AP comprises a multiple BSSID element of a multiple BSSID set to which the reporting AP belongs.

15. The MLD according to claim 11, wherein the information about the reported AP comprises a multiple BSSID element of a multiple BSSID set to which the reported AP belongs.

16. The MLD according to claim 11, wherein the multiple BSSID element comprises a nontransmitted BSSID profile, and the nontransmitted BSSID profile comprises a MAC address of an MLD in which a nontransmitted BSSID AP is located.

17. The MLD according to claim 11, wherein the information about the reported AP comprises a bit indicating whether the reported AP is a transmitted BSSID AP.

18. The MLD according to claim 11, wherein the information about the reported AP comprises a bit indicating whether the reported AP is a member of a multiple BSSID set.

19. The MLD according to claim 11, wherein the information about the reported AP comprises two bits which respectively indicate whether the reported AP is a member of a multiple BSSID set and whether the reported AP is a transmitted BSSID AP.

20. The MLD according to claim 11, wherein the shared information further comprises an indication of a quantity of reported AP.

* * * * *